(12) United States Patent
Dunga et al.

(10) Patent No.: US 12,469,555 B2
(45) Date of Patent: Nov. 11, 2025

(54) UNSELECT WORD LINE SWITCH BIAS SCHEME FOR NON-VOLATILE MEMORY APPARATUS

(71) Applicant: Sandisk Technologies, Inc., Milpitas, CA (US)

(72) Inventors: Mohan Dunga, Santa Clara, CA (US); Sudarshan Narayanan, San Jose, CA (US); Satoru Mayuzumi, Milpitas, CA (US)

(73) Assignee: Sandisk Technologies, Inc., Milpitas, CA (US)

(\*) Notice: Subject to any disclaimer, the term of this patent is extended or adjusted under 35 U.S.C. 154(b) by 128 days.

(21) Appl. No.: 18/228,088

(22) Filed: Jul. 31, 2023

(65) Prior Publication Data
US 2024/0386960 A1    Nov. 21, 2024

Related U.S. Application Data

(60) Provisional application No. 63/466,938, filed on May 16, 2023.

(51) Int. Cl.
| | |
|---|---|
| G11C 16/06 | (2006.01) |
| G11C 16/04 | (2006.01) |
| G11C 16/08 | (2006.01) |
| H10B 43/27 | (2023.01) |
| H10B 43/35 | (2023.01) |
| H10B 43/10 | (2023.01) |

(52) U.S. Cl.
CPC .......... G11C 16/08 (2013.01); G11C 16/0483 (2013.01); H10B 43/27 (2023.02); H10B 43/35 (2023.02); H10B 43/10 (2023.02)

(58) Field of Classification Search
CPC .... G11C 16/08; G11C 16/0483; H10B 43/27; H10B 43/35; H10B 43/10
USPC ...................................................... 365/185.23
See application file for complete search history.

(56) References Cited

U.S. PATENT DOCUMENTS

| | | | |
|---|---|---|---|
| 8,437,199 B2 * | 5/2013 | Park .................. | G11C 16/0483 365/185.25 |
| 11,081,185 B2 * | 8/2021 | Chibvongodze ....... | H10B 43/10 |
| 11,211,370 B2 | 12/2021 | Kim et al. | |
| 2019/0066789 A1 | 2/2019 | Sakai et al. | |

\* cited by examiner

*Primary Examiner* — Tha-O H Bui
(74) *Attorney, Agent, or Firm* — Dickinson Wright PLLC

(57) ABSTRACT

A memory apparatus and method of operation are provided. The apparatus includes word line switches coupled to word lines connected to memory cells. The word line switches are each configured to retain a switch threshold voltage and selectively connect the word lines to a common driver for supplying voltages thereto during a memory operation. A control means is configured to apply predetermined select block switch voltages to a first set of the word line switches connected to the word lines of a selected block. The predetermined select block switch voltages are based on the memory operation performed. The control means apply a predetermined unselect block switch voltage to a second set of the word line switches connected to the word lines of an unselected block. The predetermined unselect block switch voltage is selected to lower the switch threshold voltage of the word line switches of the second set.

17 Claims, 16 Drawing Sheets

APPLYING PREDETERMINED SELECT BLOCK SWITCH VOLTAGES TO A FIRST SET OF THE WORD LINE SWITCHES CONNECTED TO THE PLURALITY OF WORD LINES OF A SELECTED ONE OF A PLURALITY OF BLOCKS OF THE MEMORY CELLS DURING THE MEMORY OPERATION, THE PREDETERMINED SELECT BLOCK SWITCH VOLTAGES BASED ON THE MEMORY OPERATION BEING PERFORMED ── 1700

APPLYING A PREDETERMINED UNSELECT BLOCK SWITCH VOLTAGE TO A SECOND SET OF THE WORD LINE SWITCHES CONNECTED TO THE PLURALITY OF WORD LINES OF AN UNSELECTED ONE OF THE PLURALITY OF BLOCKS OF THE MEMORY CELLS DURING THE MEMORY OPERATION, THE PREDETERMINED UNSELECT BLOCK SWITCH VOLTAGE SELECTED TO LOWER THE SWITCH THRESHOLD VOLTAGE OF THE WORD LINE SWITCHES OF THE SECOND SET ── 1702

*FIG. 17*

UNSELECT WORD LINE SWITCH BIAS SCHEME FOR NON-VOLATILE MEMORY APPARATUS

CROSS-REFERENCE TO RELATED APPLICATIONS

This application claims the benefit of U.S. Provisional Application No. 63/466,938, filed on May 16, 2023. The entire disclosure of the application referenced above is incorporated herein by reference.

FIELD

This application relates to non-volatile memory apparatuses and the operation of non-volatile memory apparatuses.

BACKGROUND

This section provides background information related to the technology associated with the present disclosure and, as such, is not necessarily prior art.

Semiconductor memory is widely used in various electronic devices such as cellular telephones, digital cameras, personal digital assistants, medical electronics, mobile computing devices, servers, solid state drives, non-mobile computing devices and other devices. Semiconductor memory may comprise non-volatile memory or volatile memory. A non-volatile memory allows information to be stored and retained even when the non-volatile memory is not connected to a source of power (e.g., a battery).

Reductions in size of such memory apparatuses is desirable, however, various limitations exist in reducing the size of certain components of the memory apparatus. Thus, there is a need for improved memory apparatuses and methods of operation that provide reductions in size while maintaining suitable operation and speed.

SUMMARY

This section provides a general summary of the present disclosure and is not a comprehensive disclosure of its full scope or all of its features and advantages.

An object of the present disclosure is to provide a memory apparatus and a method of operating the memory apparatus that address and overcome the above-noted shortcomings.

Accordingly, it is an aspect of the present disclosure to provide a memory apparatus including word line switches coupled to a plurality of word lines each connected to memory cells. The word line switches are each configured to retain a switch threshold voltage and selectively connect one or more of the plurality of word lines to a common driver for supplying voltages to the one or more of the plurality of word lines during a memory operation. A control means is coupled to the word line switches and is configured to apply predetermined select block switch voltages to a first set of the word line switches connected to the plurality of word lines of a selected one of a plurality of blocks of the memory cells during the memory operation. The predetermined select block switch voltages are based on the memory operation being performed. The control means is also configured to apply a predetermined unselect block switch voltage to a second set of the word line switches connected to the plurality of word lines of an unselected one of the plurality of blocks of the memory cells during the memory operation. The predetermined unselect block switch voltage is selected to lower the switch threshold voltage of the word line switches of the second set.

According to another aspect of the disclosure, a controller in communication with a memory apparatus including word line switches coupled to a plurality of word lines each connected to memory cells. The word line switches are each configured to retain a switch threshold voltage and selectively connect one or more of the plurality of word lines to a common driver for supplying voltages to the one or more of the plurality of word lines during a memory operation. The controller is configured to instruct the memory apparatus to apply predetermined select block switch voltages to a first set of the word line switches connected to the plurality of word lines of a selected one of a plurality of blocks of the memory cells during the memory operation. The predetermined select block switch voltages are based on the memory operation being performed. The controller is also configured to instruct the memory apparatus to apply a predetermined unselect block switch voltage to a second set of the word line switches connected to the plurality of word lines of an unselected one of the plurality of blocks of the memory cells during the memory operation. The predetermined unselect block switch voltage is selected to lower the switch threshold voltage of the word line switches of the second set.

According to an additional aspect of the disclosure, a method of operating a memory apparatus is provided. The memory apparatus includes word line switches coupled to a plurality of word lines each connected to memory cells. The word line switches are each configured to retain a switch threshold voltage and selectively connect one or more of the plurality of word lines to a common driver for supplying voltages to the one or more of the plurality of word lines during a memory operation. The method includes the step of applying predetermined select block switch voltages to a first set of the word line switches connected to the plurality of word lines of a selected one of a plurality of blocks of the memory cells during the memory operation. The predetermined select block switch voltages are based on the memory operation being performed. The method also includes the step of applying a predetermined unselect block switch voltage to a second set of the word line switches connected to the plurality of word lines of an unselected one of the plurality of blocks of the memory cells during the memory operation. The predetermined unselect block switch voltage selected to lower the switch threshold voltage of the word line switches of the second set.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 17 illustrates steps of a method of operating a memory apparatus according to aspects of the disclosure.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
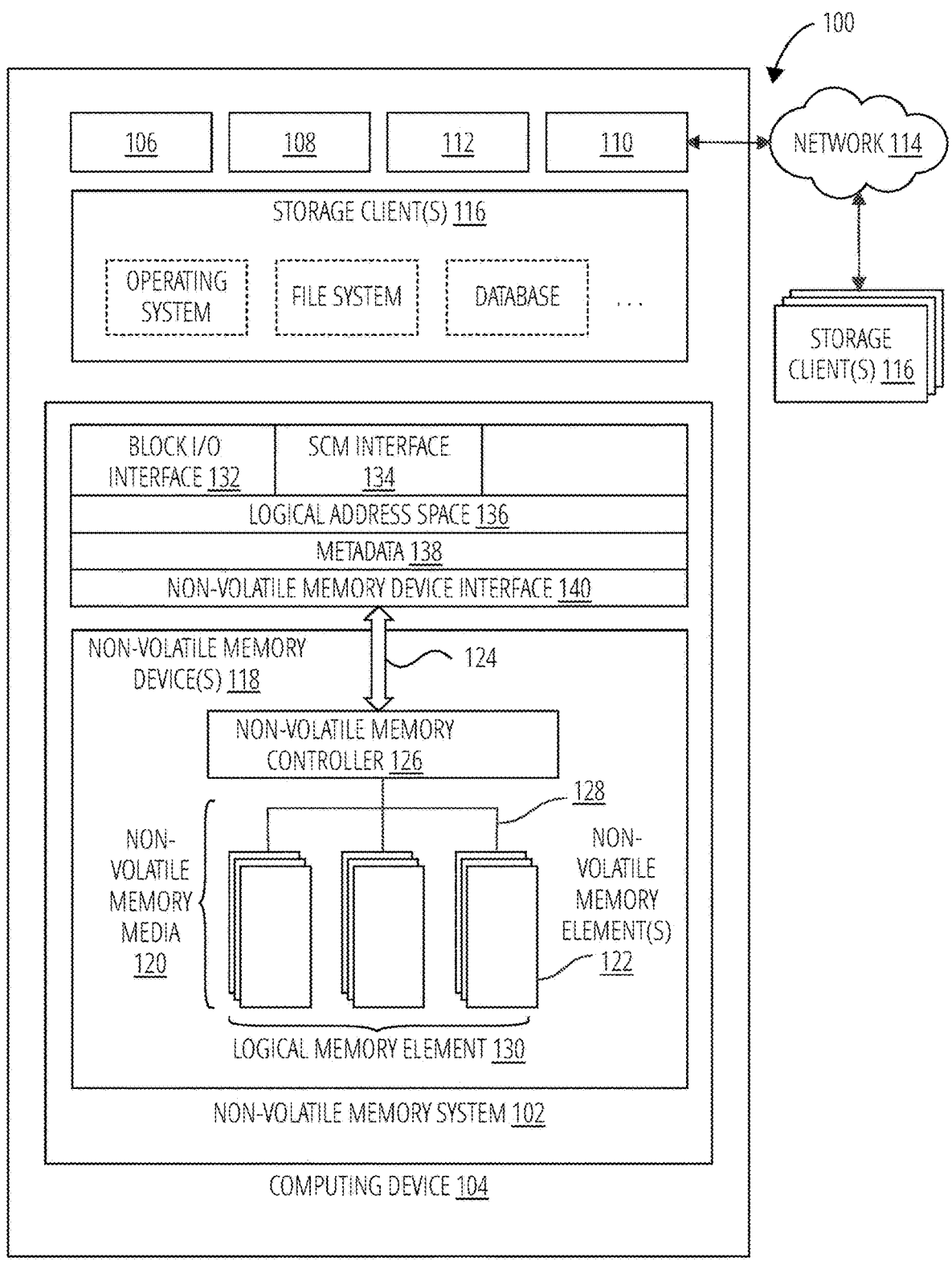
FIG. 1 is a schematic block diagram illustrating a system according to aspects of the disclosure.

In the following description, details are set forth to provide an understanding of the present disclosure. In some instances, certain circuits, structures and techniques have not been described or shown in detail in order not to obscure the disclosure.

In general, the present disclosure relates to non-volatile memory apparatuses of the type well-suited for use in many applications. The non-volatile memory apparatus and associated methods of operation of this disclosure will be described in conjunction with one or more example embodiments. However, the specific example embodiments disclosed are merely provided to describe the inventive concepts, features, advantages and objectives with sufficient clarity to permit those skilled in this art to understand and practice the disclosure. Specifically, the example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

In some memory devices or apparatuses, memory cells are joined to one another such as in NAND strings in a block or sub-block. Each NAND string comprises a number of memory cells connected in series between one or more drain-side select gate SG transistors (SGD transistors), on a drain-side of the NAND string which is connected to a bit line, and one or more source-side select gate SG transistors (SGS transistors), on a source-side of the NAND string which is connected to a source line. Further, the memory cells can be arranged with a common control gate line (e.g., word line) which acts a control gate. A set of word lines extends from the source side of a block to the drain side of a block. Memory cells can be connected in other types of strings and in other ways as well.

In a 3D memory structure, the memory cells may be arranged in vertical strings in a stack, where the stack comprises alternating conductive and dielectric layers. The conductive layers act as word lines which are connected to the memory cells. The memory cells can include data memory cells, which are eligible to store user data, and dummy or non-data memory cells which are ineligible to store user data.

Before programming certain non-volatile memory devices, the memory cells are typically erased. For some devices, the erase operation removes electrons from the floating gate of the memory cell being erased. Alternatively, the erase operation removes electrons from the charge-trapping layer.

Each memory cell may be associated with a data state according to write data in a program command. Based on its data state, a memory cell will either remain in the erased state or be programmed to a programmed data state. For example, in a three bit per cell memory device, there are eight data states including the erased state and the programmed state.

During a program operation, the memory cells are programmed according to a word line programming order. For example, the programming may start at the word line at the source side of the block and proceed to the word line at the drain side of the block. In one approach, each word line is completely programmed before programming a next word line. For example, a first word line, WL0, is programmed using one or more programming pulses until the programming is completed. Next, a second word line, WL1, is programmed using one or more programming pulses until the programming is completed, and so forth. A programming pulse may include a set of increasing program voltages which are applied to the word line in respective program loops or program-verify iterations. Verify operations or stages may be performed after each program voltage to determine whether the memory cells have completed programming. When programming is completed for a memory cell, it can be inhibited from further programming while programming continues for other memory cells in subsequent program loops.

A memory device may have word line switches (WLSW) coupled to one or more word lines (WLs) from blocks of memory cells. As the quantity of word lines increases, the quantity of word line switches per block increases. Thus, a width of switches increases and as a result, the area of the memory die needed for the word line switches also increases.

FIG. 1 is a block diagram of one embodiment of a system 100 comprising non-volatile memory device(s) 118 configured in accordance with an embodiment of the claimed solution. A computing device 104 may comprise non-volatile memory system 102, a processor 106, volatile memory 108, and a communication interface 110. The processor 106 may comprise one or more central processing units, one or more general-purpose processors, one or more application-specific processors, one or more virtual processors (e.g., the computing device 104 may be a virtual machine operating within a host), one or more processor cores, or the like. The communication interface 110 may comprise one or more network interfaces configured to communicatively couple the computing device 104 and/or non-volatile memory controller 126 to a communication network 114, such as an Internet Protocol (IP) network, a Storage Area Network (SAN), wireless network, wired network, or the like.

The non-volatile memory device(s) 118, in various embodiments, may be disposed in one or more different locations relative to the computing device 104. In one embodiment, the non-volatile memory device(s) 118 comprises one or more non-volatile memory element(s) 122, such as semiconductor chips, memory die, or packages or other integrated circuit devices disposed on one or more printed circuit boards, storage housings, and/or other mechanical and/or electrical support structures. For example, the non-volatile memory device(s) 118 may comprise one or more direct inline memory module (DIMM) cards, one or more expansion cards and/or daughter cards, a solid-state-drive (SSD) or other hard drive device, and/or may have another memory and/or storage form factor known to those of skill in the art. The non-volatile memory device(s) 118 may be integrated with, and/or mounted on, a motherboard of the computing device 104, installed in a port and/or slot of the computing device 104, installed on a different computing device 104 and/or a dedicated storage appliance on the network 114, in communication with the computing device 104 over an external bus (e.g., an external hard drive), or the like.

The non-volatile memory device(s) 118, in one embodiment, may be disposed on a memory bus of a processor 106 (e.g., on the same memory bus as the volatile memory 108, on a different memory bus from the volatile memory 108, in place of the volatile memory 108, or the like). In a further embodiment, the non-volatile memory device(s) 118 may be disposed on a peripheral bus of the computing device 104, such as a peripheral component interconnect express (PCI Express or PCIe) bus, a serial Advanced Technology Attachment (SATA) bus, a parallel Advanced Technology Attachment (PATA) bus, a small computer system interface (SCSI) bus, a FireWire bus, a Fibre Channel connection, a Universal Serial Bus (USB), a PCIe Advanced Switching (PCIe-AS) bus, or the like. In another embodiment, the non-volatile memory device(s) 118 may be disposed on a data network 114, such as an Ethernet network, an Infiniband network, SCSI RDMA over a network 114, a storage area network (SAN), a local area network (LAN), a wide area network (WAN) such as the Internet, another wired and/or wireless network 114, or the like.

The computing device 104 may further comprise a non-transitory, computer readable storage medium 112. The computer readable storage medium 112 may comprise executable instructions configured to cause the computing device 104 (e.g., processor 111) to perform steps of one or more of the methods disclosed herein.

According to various embodiments, a non-volatile memory controller 126 may manage one or more non-volatile memory device(s) 118 and/or non-volatile memory element(s) 122. The non-volatile memory device(s) 118 may comprise recording, memory, and/or storage devices, such as solid-state storage device(s) and/or semiconductor storage device(s) that are arranged and/or partitioned into a plurality of addressable storage locations. As used herein, a storage location refers to any physical unit of memory (e.g., any quantity of physical storage media on a non-volatile memory device(s) 118). Memory units may include, but are not limited to: pages, memory divisions, blocks, data blocks, erase blocks, sectors, collections or sets of physical storage locations (e.g., logical pages, logical blocks, logical erase blocks), or the like.

A device driver and/or the non-volatile memory controller 126, in certain embodiments, may present a logical address space 136 to the storage client(s) 116. As used herein, a logical address space 136 refers to a logical representation of memory resources. The logical address space 136 may comprise a plurality (e.g., range) of logical addresses. As used herein, a logical address refers to any identifier for referencing a memory resource (e.g., data), including, but not limited to: a logical block address (LBA), cylinder/head/sector (CHS) address, a file name, an object identifier, an inode, a Universally Unique Identifier (UUID), a Globally Unique Identifier (GUID), a hash code, a signature, an index entry, a range, an extent, or the like.

A device driver for the non-volatile memory device(s) 118 may maintain metadata 138, such as a logical to physical address mapping structure, to map logical addresses of the logical address space 136 to storage location on the non-volatile memory device(s) 118. A device driver may be configured to provide storage services to one or more storage client(s) 116. The storage client(s) 116 may include local storage client(s) 116 operating on the computing device 104 and/or remote, storage client(s) 116 accessible via the network 114 and/or communication interface 110. The storage client(s) 116 may include, but are not limited to: operating systems, file systems, database applications, server applications, kernel-level processes, user-level processes, applications, and the like.

A device driver may be communicatively coupled to one or more non-volatile memory device(s) 118. The one or more non-volatile memory device(s) 118 may include different types of non-volatile memory devices including, but not limited to: solid-state storage devices, semiconductor storage devices, SAN storage resources, or the like. The one or more non-volatile memory device(s) 118 may comprise one or more of a respective non-volatile memory controller 126 and/or non-volatile memory media 120. A device driver may provide access to the one or more non-volatile memory device(s) 118 via a traditional block I/O interface 132. Additionally, a device driver may provide access to other functionality through the storage class memory interface (SCM interface 134). The metadata 138 may be used to manage and/or track data operations performed through any of the block I/O interface 132, SCM interface 134, or other, related interfaces.

In one embodiment, a user application such as software application operating on or in conjunction with the storage client(s) 116 uses the non-volatile memory system 102. The storage client(s) 116 manage files and data and utilizes the functions and features of the non-volatile memory controller 126 and associated non-volatile memory media 120. Representative examples of storage clients include, but are not limited to, a server, a file system, an operating system, a database management system ("DBMS"), a volume manager, and the like. In one embodiment, the storage client(s) 116 access to the one or more non-volatile memory device(s) 118 via a traditional block I/O interface 132.

Certain conventional block storage devices divide the storage media into volumes or partitions. Each volume or partition may include a plurality of sectors. One or more sectors are organized into a block (also referred to as a data block). In certain storage systems, such as those interfacing with the Windows® operating systems, the data blocks are referred to as clusters. In other storage systems, such as those interfacing with UNIX, Linux, or similar operating systems, the data blocks are referred to simply as blocks. A block or cluster represents a smallest physical amount of storage space on the storage media that is managed by the non-volatile memory controller 126. A block storage device may associate n blocks available for user data storage across the non-volatile memory media 120 with a logical block address, numbered from 0 to n. In certain block storage devices, the logical block addresses may range from 0 to n per volume or partition. In conventional block storage devices, a logical block address maps directly to a particular logical block.

A device driver may present a logical address space 136 to the storage client(s) 116 through one or more interfaces. As discussed above, the logical address space 136 may comprise a plurality of logical addresses, each corresponding to respective storage locations within the one or more non-volatile memory device(s) 118. A device driver may maintain metadata 138 comprising any-to-any mappings between logical addresses and storage locations, or the like.

A device driver may further comprise and/or be in communication with a non-volatile memory device interface 140 configured to transfer data, commands, and/or queries to the one or more non-volatile memory device(s) 118 over a bus 124, which may include, but is not limited to: a memory bus of a processor 106, a peripheral component interconnect express (PCI Express or PCIe) bus, a serial Advanced Technology Attachment (ATA) bus, a parallel ATA bus, a small computer system interface (SCSI), FireWire, Fibre Channel, a Universal Serial Bus (USB), a PCIe Advanced Switching (PCIe-AS) bus, a network 114, Infiniband, SCSI RDMA, non-volatile memory express (NVMe), or the like. The non-volatile memory device interface 140 may communicate with the one or more non-volatile memory device(s) 118 using input-output control (IO-CTL) command(s), IO-CTL command extension(s), remote direct memory access, or the like.

The communication interface 110 may comprise one or more network interfaces configured to communicatively couple the computing device 104 and/or the non-volatile memory controller 126 to a network 114 and/or to one or more remote, network-accessible storage client(s) 116. The storage client(s) 116 may include local storage client(s) 116 operating on the computing device 104 and/or remote, storage client(s) 116 accessible via the network 114 and/or the communication interface 110. The non-volatile memory controller 126 is part of and/or in communication with one or more non-volatile memory device(s) 118. Although FIG. 1 depicts a single non-volatile memory device(s) 118, the disclosure is not limited in this regard and could be adapted to incorporate any number of non-volatile memory device(s) 118.

The non-volatile memory device(s) 118 may comprise one or more non-volatile memory element(s) 122 of non-volatile memory media 120, which may include but is not limited to: ReRAM, Memristor memory, programmable metallization cell memory, phase-change memory (PCM, PCME, PRAM, PCRAM, ovonic unified memory, chalcogenide RAM, or C-RAM), NAND flash memory (e.g., 2D NAND flash memory, 3D NAND flash memory), NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon (SONOS), programmable metallization cell (PMC), conductive-bridging RAM (CBRAM), magneto-resistive RAM (MRAM), magnetic storage media (e.g., hard disk, tape), optical storage media, or the like. The one or more non-volatile memory element(s) 122 of non-volatile memory media 120, in certain embodiments, comprise storage class memory (SCM).

While legacy technologies such as NAND flash may be block and/or page addressable, storage class memory, in one embodiment, is byte addressable. In further embodiments, storage class memory may be faster and/or have a longer life (e.g., endurance) than NAND flash; may have a lower cost, use less power, and/or have a higher storage density than DRAM; or offer one or more other benefits or improvements when compared to other technologies. For example, storage class memory may comprise one or more non-volatile memory element(s) 122 of ReRAM, Memristor memory, programmable metallization cell memory, phase-change memory, nano RAM, nanocrystal wire-based memory, silicon-oxide based sub-10 nanometer process memory, graphene memory, SONOS memory, PMC memory, CBRAM, MRAM, and/or variations thereof.

While the non-volatile memory media 120 is referred to herein as "memory media," in various embodiments, the non-volatile memory media 120 may more generally comprise one or more non-volatile recording media capable of recording data, which may be referred to as a non-volatile memory medium, a non-volatile storage medium, or the like. Further, the non-volatile memory device(s) 118, in various embodiments, may comprise a non-volatile recording device, a non-volatile memory device, a non-volatile storage device, or the like.

The non-volatile memory media 120 may comprise one or more non-volatile memory element(s) 122, which may include, but are not limited to: chips, packages, planes, die, or the like. A non-volatile memory controller 126 may be configured to manage data operations on the non-volatile memory media 120, and may comprise one or more processors, programmable processors (e.g., FPGAs), ASICs, micro-controllers, or the like. In some embodiments, the non-volatile memory controller 126 is configured to store data on and/or read data from the non-volatile memory media 120, to transfer data to/from the non-volatile memory device(s) 118, and so on.

The non-volatile memory controller 126 may be communicatively coupled to the non-volatile memory media 120 by way of a bus 128. The bus 128 may comprise a bus for communicating data to/from the non-volatile memory element(s) 122. The bus 128, in one embodiment, may further comprise a control bus for communicating addressing and other command and control information to the non-volatile memory element(s) 122. In some embodiments, the bus 128 may communicatively couple the non-volatile memory element(s) 122 to the non-volatile memory controller 126 in parallel. This parallel access may allow the non-volatile memory element(s) 122 to be managed as a group, forming a logical memory element 130. The logical memory element 130 may be partitioned into respective logical memory units (e.g., logical pages) and/or logical memory divisions (e.g., logical data blocks, logical blocks, logical erase blocks). The logical memory units may be formed by logically combining physical memory units of each of the non-volatile memory element(s) 122.

In some embodiments, the non-volatile memory controller 126 may be configured to store data on one or more asymmetric, write-once media, such as non-volatile memory media 120. As used herein, a "write once" storage medium refers to a storage medium that is reinitialized (e.g., erased) each time new data is written or programmed thereon. As used herein, an "asymmetric" storage medium refers to a storage medium having different latencies for different storage operations. Many types of non-volatile memory media 120 are asymmetric; for example, a read operation may be much faster than a write/program operation, and a write/program operation may be much faster than an erase operation (e.g., reading the media may be hundreds of times faster than erasing, and tens of times faster than programming the media).

The non-volatile memory media 120 may be partitioned into memory divisions that can be erased as a group (e.g., erase blocks) in order to, inter alia, account for the asymmetric properties of the media. As such, modifying a single data sector or data block in-place may require erasing the entire erase block comprising the data, and rewriting the modified data to the erase block, along with the original, unchanged data. This may result in inefficient "write amplification," which may excessively wear the non-volatile memory media 120.

Therefore, in some embodiments, the non-volatile memory controller 126 may be configured to write data out-of-place. As used herein, writing data "out-of-place" refers to writing data to different physical storage location(s) rather than overwriting the data "in-place" (e.g., overwriting the data in the original physical location). Modifying data out-of-place may avoid write amplification, since existing, valid data on the erase block with the data to be modified need not be erased and rewritten. Moreover, writing data out-of-place may remove erasure from the latency impact of certain storage operations.

The non-volatile memory controller 126 may be organized according to a plurality of erase blocks of word lines within a non-volatile memory element(s) 122, in certain embodiments, using addresses of the word lines, such that the word lines are logically organized into a monotonically increasing sequence (e.g., decoding and/or translating addresses for word lines into a monotonically increasing sequence, or the like). In a further embodiment, word lines of an erase block within a non-volatile memory element(s) 122 may be physically arranged in a monotonically increasing sequence of word line addresses, with consecutively addressed word lines also being physically adjacent (e.g., WL0, WL1, WL2, . . . WLN).

The non-volatile memory controller 126 may comprise and/or be in communication with a device driver executing on the computing device 104. A device driver may provide storage services to the storage client(s) 116 via one or more interfaces (block I/O interface 132, SCM interface 134, and/or others). In some embodiments, a device driver provides a computing device 104 block I/O interface 132 through which storage client(s) 116 perform block-level I/O operations. Alternatively, or in addition, a device driver may provide an SCM interface 134, which may provide other storage services to the storage client(s) 116. In some embodiments, the SCM interface 134 may comprise extensions to the block I/O interface 132 (e.g., storage client(s) 116 may access the SCM interface 134 through extensions or additions to the block I/O interface 132). Alternatively, or in addition, the SCM interface 134 may be provided as a separate API, service, and/or library.

A device driver may further comprise a non-volatile memory device interface 140 that is configured to transfer data, commands, and/or queries to the non-volatile memory controller 126 over a bus 124, as described above.

Figure 2:
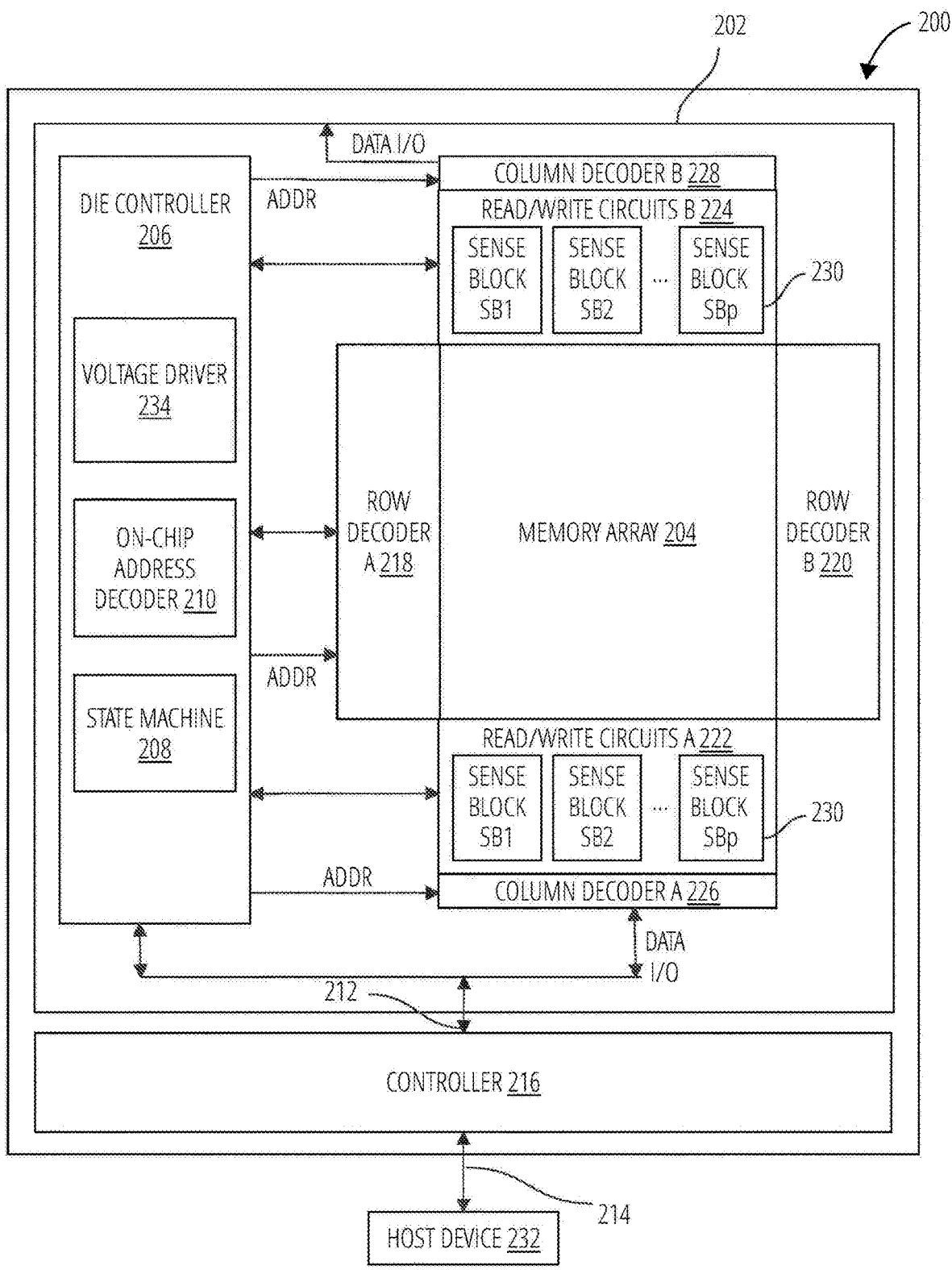
FIG. 2 is a schematic block diagram illustrating another system according to aspects of the disclosure.

FIG. 2 illustrates an embodiment of a non-volatile storage system 200 that may include one or more memory die(s) 202 or chips. Memory die(s) 202, in some embodiments, include a memory array 204 (two-dimensional or three dimensional) of memory cells, die controller 206, read/write circuits A 222, and read/write circuits B 224. In one embodiment, access to the memory array 204 by the various peripheral circuits is implemented in a symmetric fashion, on opposite sides of the array, so that the densities of access lines and circuitry on each side are reduced by half. The read/write circuits A 222 and read/write circuits B 224, in a further embodiment, include multiple sense amplifiers 230 which allow a page of memory cells to be read or programmed in parallel.

The memory array 204, in various embodiments, is addressable by word lines via row decoder A 218 and row decoder B 220 and by bit lines via column decoder A 226 and column decoder B 228. In some embodiments, a controller 216 is included in the same memory system 200 (e.g., a removable storage card or package) as the one or more memory die(s) 202. Commands and data are transferred between the host device 232 and controller 216 via lines 214 and between the controller and the one or more memory die(s) 202 via lines 212. One implementation can include multiple memory die(s) 202.

Die controller 206, in one embodiment, cooperates with the read/write circuits A 222 and read/write circuits B 224 to perform storage/memory operations on the memory array 204. The die controller 206, in certain embodiments, includes a voltage driver 234, a state machine 208, and an on-chip address decoder 210. In one embodiment, the state machine 208 comprises at least a portion of the voltage driver 234. In another embodiment, the controller 216 comprises at least a portion of the voltage driver 234.

The voltage driver 234, in one embodiment, is configured to supply a voltage to one or more components of the memory array. The magnitude of the voltage and whether the voltage level supplied is increasing or decreasing depends on the operation that the die controller 206 is implementing. At one point during an operation, the voltage level provided by the voltage driver 234 may comprise an analog signal increasing from ground or zero voltage, or a level substantially close to zero, to a desired voltage level required by components coupled to the voltage driver 234 to implement the desired operation. As the voltage applied to a component coupled to the voltage driver 234 increases, the period of time during which the voltage level is changing is referred to herein as charging, pre-charging, or ramping up.

At another point during an operation, the voltage level provided by the voltage driver 234 may comprise an analog signal configured to maintain a voltage level required by components coupled to the voltage driver 234 for a particular stage of implementing a desired operation. As the voltage applied to a component coupled to the voltage driver 234 remains substantially at the desired voltage level, the period of time is referred to herein as a steady state or stable.

At another point during an operation, the voltage level provided by the voltage driver 234 may comprise an analog signal decreasing from a desired voltage level to a lower voltage level, a ground level, or zero voltage, or a level substantially close to zero, for a desired operation. As the voltage applied to a component coupled to the voltage driver 234 decreases the period during which the voltage level is changing is referred to herein as discharging, post-charging, or ramping down.

The state machine 208, in one embodiment, provides chip-level control of storage and/or memory operations. The on-chip address decoder 210 provides an address interface to convert between the address that is used by the host or a memory controller to the hardware address used by the row decoder A 218, row decoder B 220, column decoder A 226 a, and column decoder B 228. The state machine 208 includes logic for activating and controlling the voltage driver 234 and other logic coupled to circuits in electrical communication with the voltage driver 234.

In one embodiment, one or any combination of die controller 206, voltage driver 234, on-chip address decoder 210, state machine 208, row decoder A 218, row decoder B 220, column decoder A 226, column decoder B 228, read/write circuits A 222, read/write circuits B 224, and/or controller 216 can be referred to as one or more managing circuits.

Figure 3:
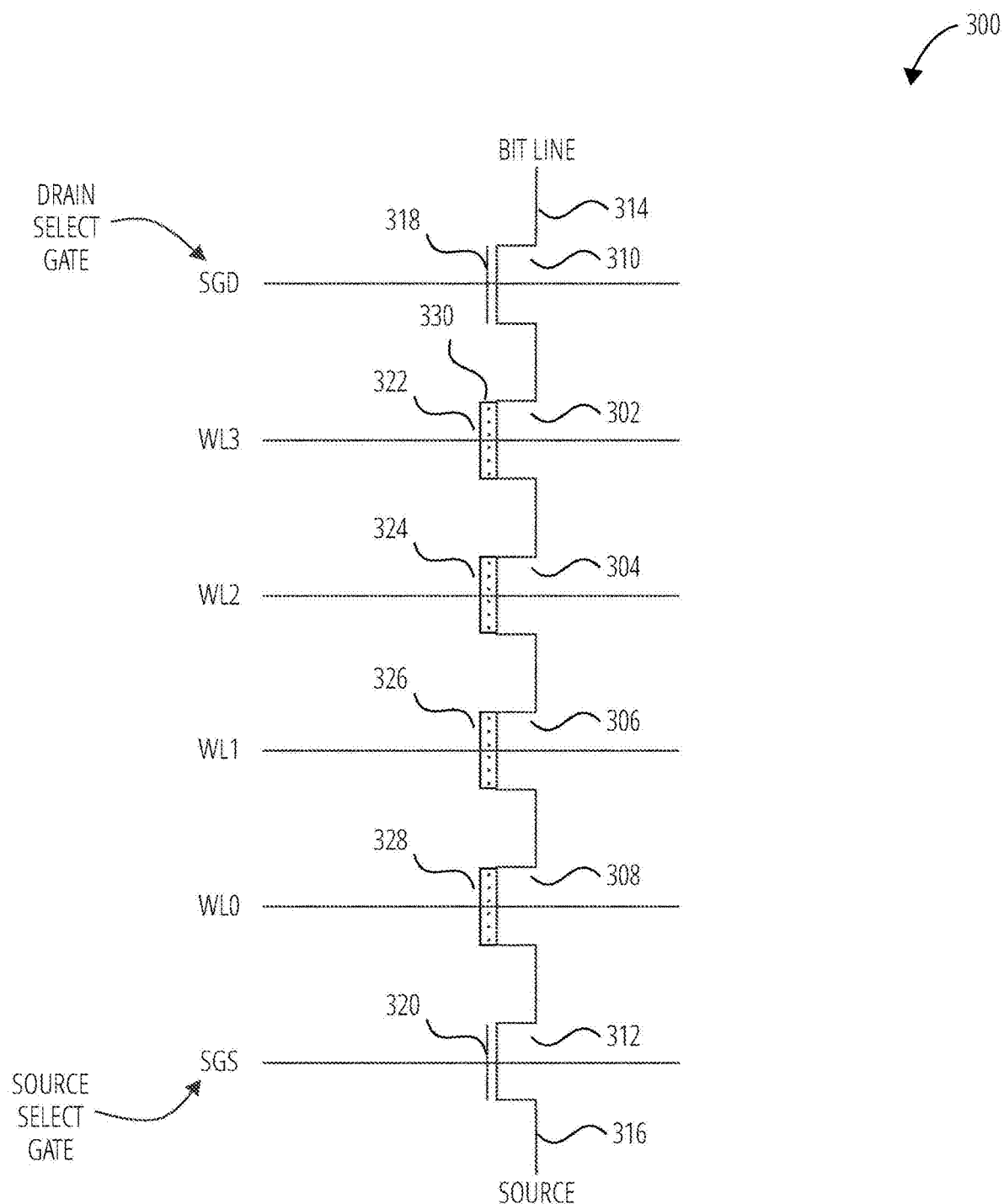
FIG. 3 is a schematic block diagram illustrating a NAND string according to aspects of the disclosure.

FIG. 3 depicts one embodiment of a NAND string 300 comprising a plurality of storage cells. The NAND string 300 depicted in FIG. 3, in some embodiments, includes four transistors (transistor 302, transistor 304, transistor 306, and transistor 308) connected in series and located between a first select transistor 310 and a second select transistor 312. In some embodiments, the transistor 302, transistor 304, transistor 306, and transistor 308 each include a control gate with a charge trap layer 330. Control gate 322, control gate 324, control gate 326, and control gate 328, in one embodiment, are connected to, or comprise a portion of, a word line. In a further embodiment, transistor 302, transistor 304, transistor 306, and transistor 308 are storage cells, storage elements, or the like, also referred to as memory cells. In some embodiments, a single storage cell may include multiple transistors.

The first select transistor 310, in some embodiments, gates/connects the NAND string 300 to a bit line 314 via a drain select gate/select gate drain (SGD). The second select transistor 312, in certain embodiments, gates/connects the NAND string 300 to a source line 316 via a source select gate/select gate source (SGS). The first select transistor 310, in a further embodiment, is controlled by applying a voltage to a corresponding select gate 318. The second select transistor 312, in some embodiments, is controlled by applying a voltage to corresponding select gate 320.

As shown in FIG. 3, the source line 316, in one embodiment, is connected to the sources of each transistor/storage cell in the NAND string 300. The NAND string 300, in some embodiments, may include some storage cells that have been programmed and some storage cells that have not been programmed.

Figure 4:
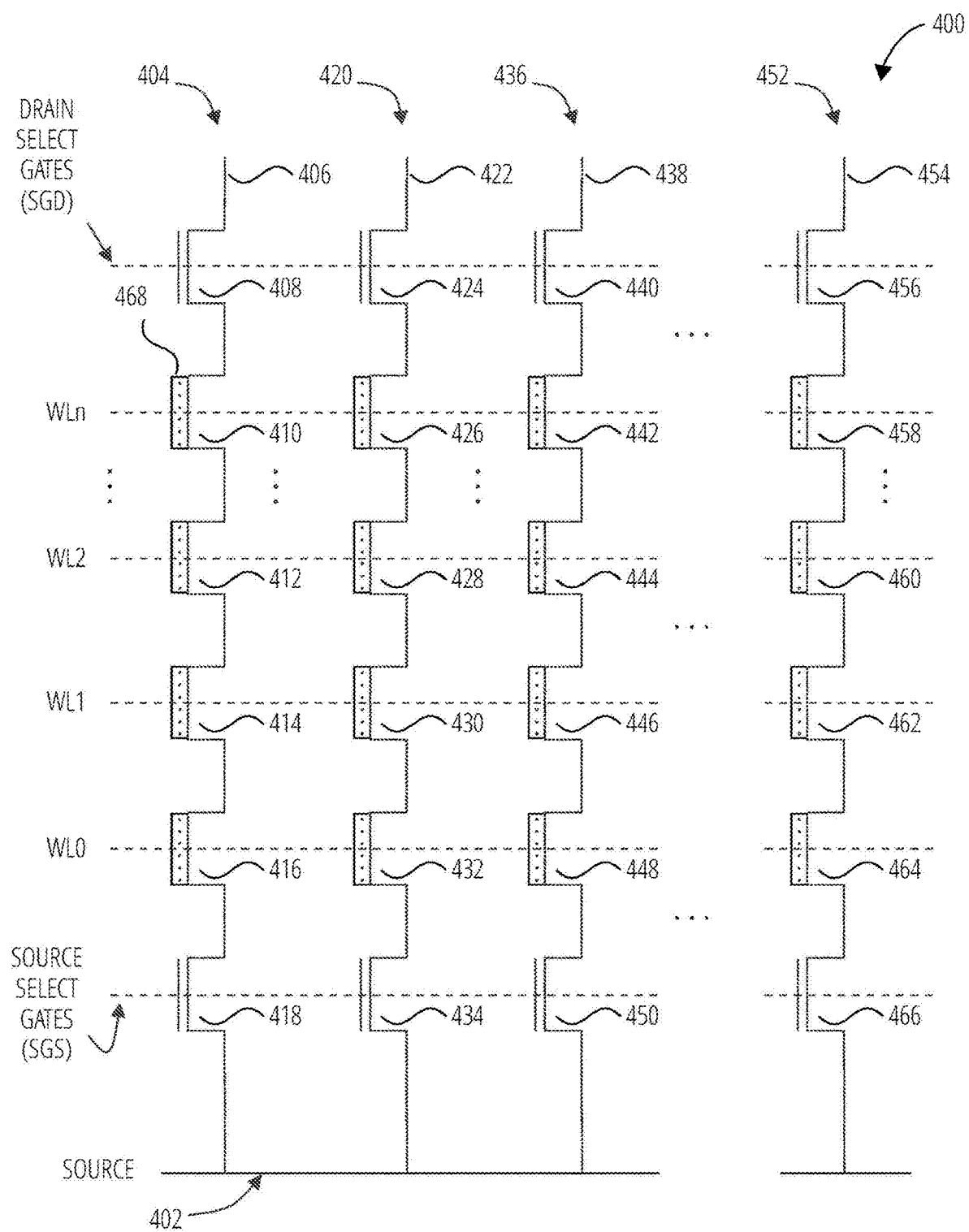
FIG. 4 is a schematic block diagram illustrating a memory array according to aspects of the disclosure.

FIG. 4 is a circuit diagram depicting a memory array 400 comprising a plurality of NAND strings. An architecture for a memory array using a NAND structure may include a significant number of NAND strings. For example, FIG. 4 illustrates a memory array 400 that includes NAND string 404, NAND string 420, NAND string 436, and NAND string 452. In the depicted embodiment, each NAND string includes drain select transistors (select transistor 408, select transistor 424, select transistor 440, and select transistor 456), source select transistors (select transistor 418, select transistor 434, select transistor 450, select transistor 466), and storage elements (storage cell 410, storage cell 412, storage cell 414, storage cell 416, storage cell 426, storage cell 428, storage cell 430, storage cell 432, storage cell 442, storage cell 444, storage cell 446, storage cell 448, storage cell 458, storage cell 460, storage cell 462, and storage cell 464). The storage cells may be transistors that incorporate a charge trap layer 468. While four storage elements per NAND string are illustrated for simplicity, some NAND strings can include any number of storage elements, e.g., thirty-two, sixty-four, or the like storage elements.

NAND string 404, NAND string 420, NAND string 436, and NAND string 452, in one embodiment, are connected to a source line 402 by source select transistor 418, select transistor 434, select transistor 450, and select transistor 466, respectively. A source select line SGS may be used to control the source side select transistors, 418, 434, 450, 466. The various NAND strings, in one embodiment, are connected to bit line 406, bit line 422, bit line 438, and bit line 454 by drain select transistor 408, select transistor 424, select transistor 440, and select transistor 456, respectively, as shown. The drain select transistors may be controlled by a drain select line SGD. In some embodiments, the select lines do not necessarily need to be in common among the NAND strings; that is, different select lines can be provided for different NAND strings.

As described above, each word line WL0-WLn connects one or more storage cells. In the depicted embodiment, bit line 406, bit line 422, bit line 438, and bit line 454, and the respective NAND string 404, NAND string 420, NAND string 436, and NAND string 452, form the respective columns of the memory array 400, storage block, erase block, or the like. These columns may also be referred to as channels. The word lines WL0-WLn, in some embodiments, comprise the rows of the memory array 400, storage block, erase block, or the like. Each word line WL0-WLn, in some embodiments, connects the control gates of each storage cell in a row. Alternatively, the control gates may be provided by the word lines WL0-WLn themselves. In some embodiments, a word line WL0-WLn may include tens, hundreds, thousands, millions, or the like of storage cells.

In one embodiment, each storage cell is configured to store data. For example, when storing one bit of digital data, the range of possible threshold voltages ("VTH") of each storage cell may be divided into two ranges which are assigned logical data "1" and "0." As used herein, threshold voltage refers to a magnitude of voltage applied to the gate of a storage cell sufficient to cause the storage cell to activate. In embodiments, in which the storage cell is a NAND transistor, the threshold voltage is a sufficient voltage applied to a gate terminal of the transistor that causes the transistor to conduct current between its source terminal and drain terminal. In one example of a NAND type flash memory, the VTH may be negative after the storage cells are erased, and defined as logic "1." In one embodiment, the VTH after a program operation is positive and defined as logic "0."

When the VTH is negative and a read is attempted, in some embodiments, storage cells will turn on to indicate logic "1" is being stored. When the VTH is positive and a read operation is attempted, in a further embodiment, a storage cell will not turn on, which indicates that logic "0" is stored. Each storage cell may also store multiple levels of information, for example, multiple bits of digital data. In such an embodiment, the range of VTH value is divided into the number of levels of data. For example, if four levels of information can be stored in each storage cell, there will be four VTH ranges assigned to the data values "11", "10", "01", and "00."

In one example of a NAND type memory, the VTH after an erase operation may be negative and defined as "11." Positive VTH values may be used for the states of "10", "01", and "00." In one embodiment, the specific relationship between the data programmed into the storage cells and the threshold voltage ranges of the storage cells depends upon the data encoding scheme adopted for the storage cells.

Figure 5:
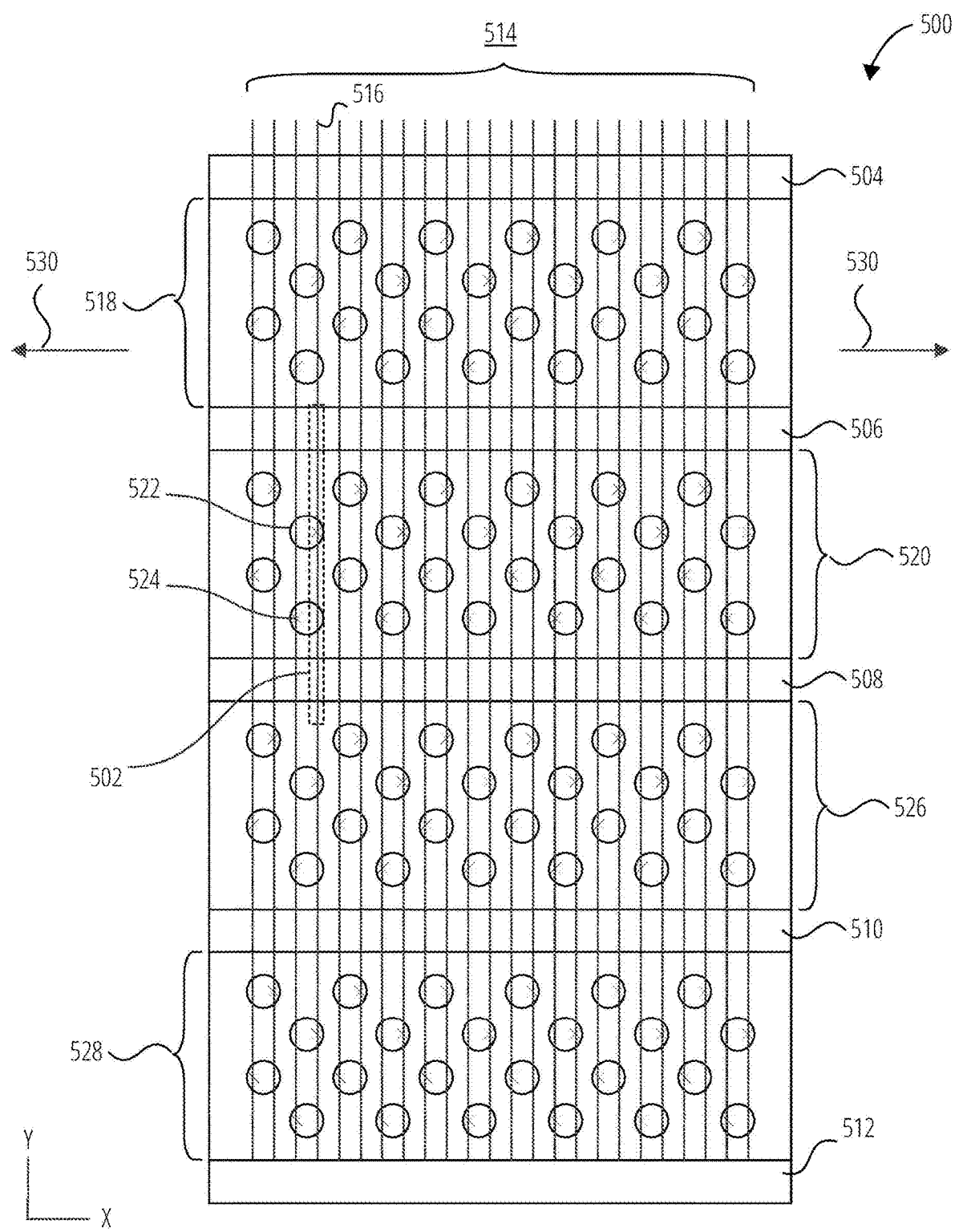
FIG. 5 illustrates one embodiment of a top view of a portion of a memory array according to aspects of the disclosure.
Figure 6:
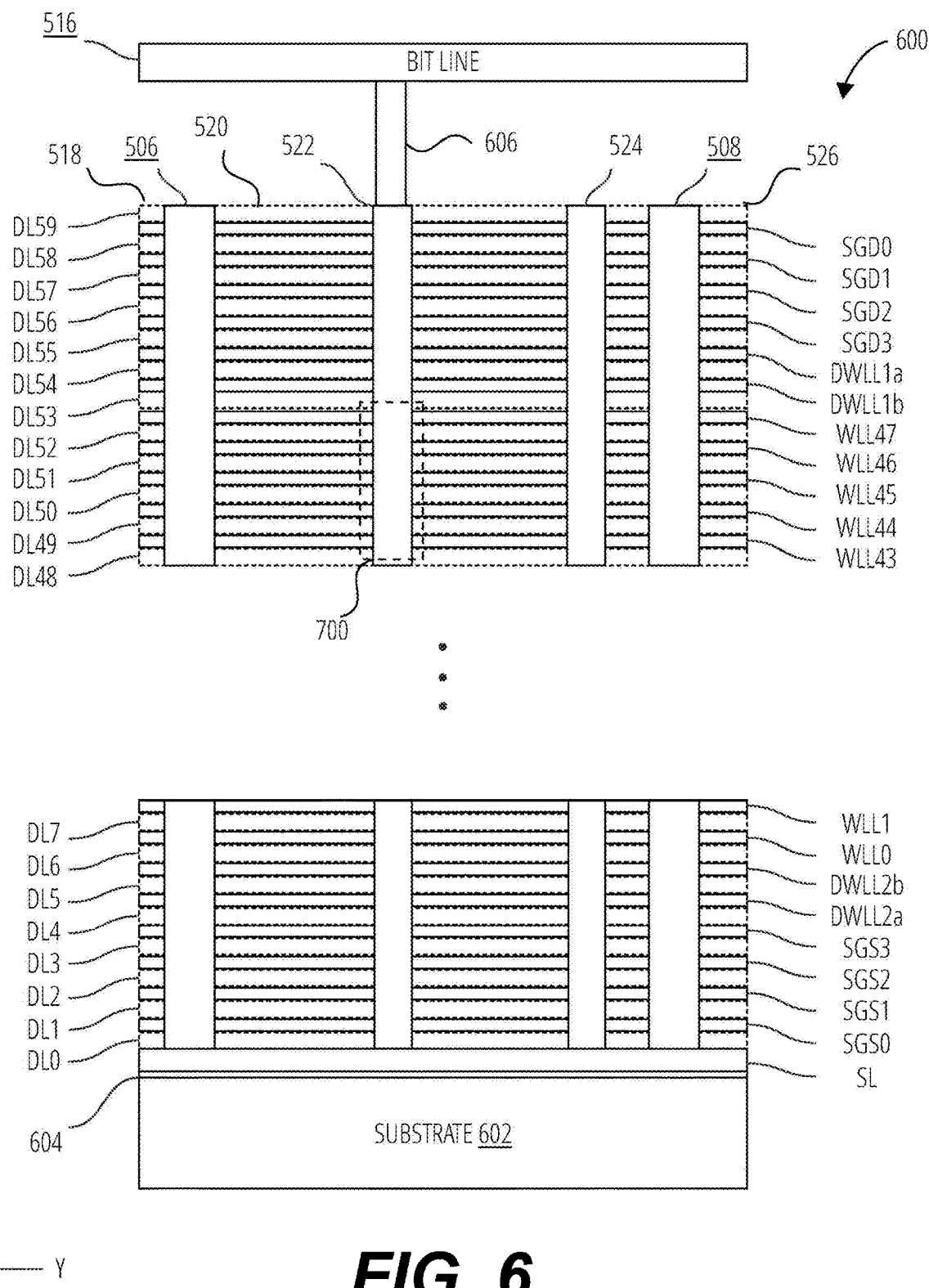
FIG. 6 illustrates one embodiment of a cross-sectional view of a portion of a memory array according to aspects of the disclosure.
Figure 7:
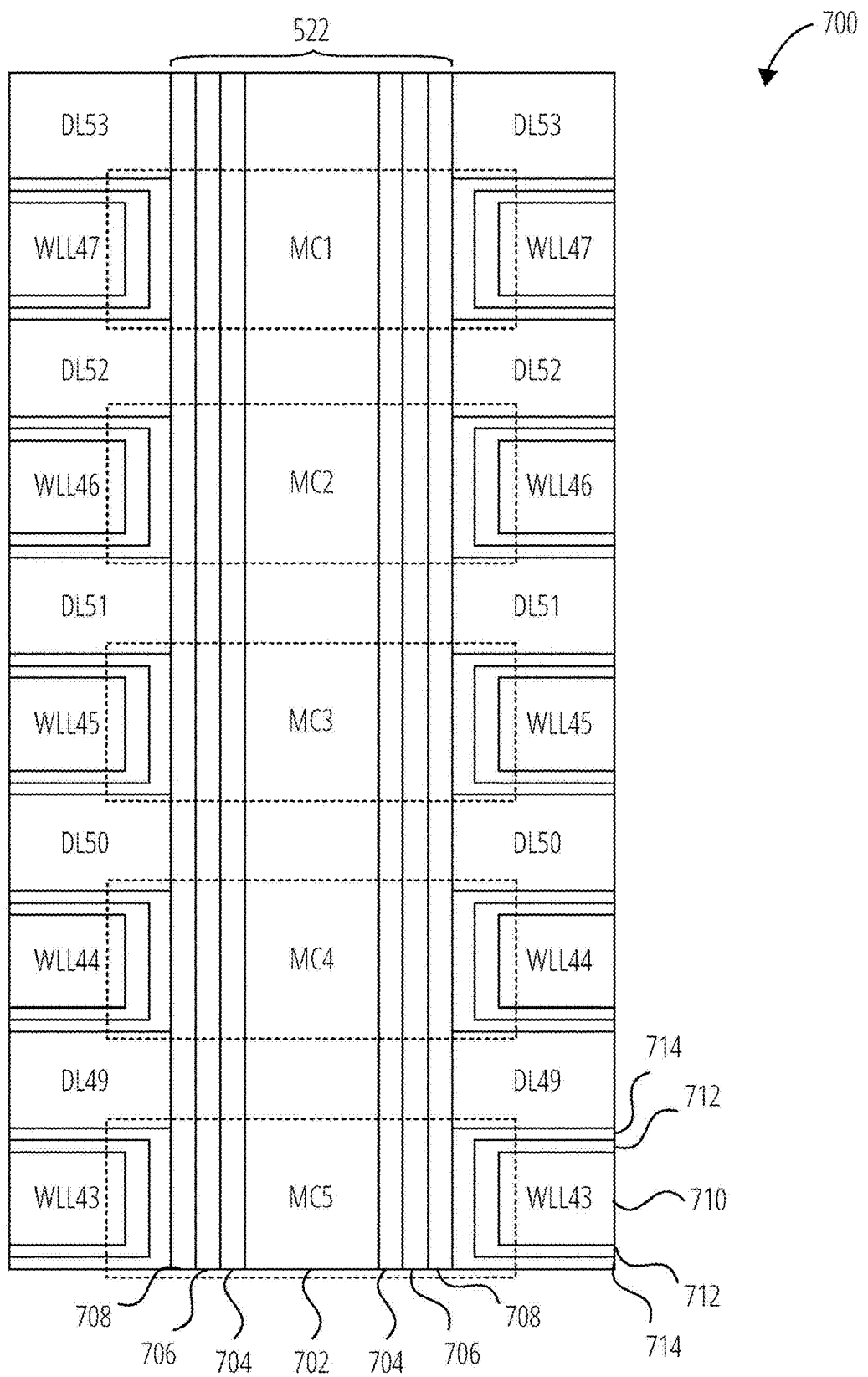
FIG. 7 illustrates a cross-sectional view of a memory array according to aspects of the disclosure.

FIG. 5-FIG. 7 depict different views of an example three dimensional memory array. FIG. 5 is a block diagram depicting a top view of a portion of three dimensional memory array. As can be seen from FIG. 5, the memory array extends 530 in the direction of the arrows shown. In one embodiment, the memory array may have between 60-128 layers. Other embodiments may have less than or more than 60-128 layers. However, FIG. 5 shows the top layer.

FIG. 5 depicts a top view of a portion of a memory array 500. A plurality of circles represent the vertical columns (e.g., vertical column 522 and vertical column 524 also referred to as channels). Each of the vertical columns includes multiple select transistors and multiple storage cells. In one embodiment, each of the vertical columns implements a NAND string. More details of the vertical columns are provided below. Since the memory array extends 530 in the direction of the two arrows shown, an erase block includes more vertical columns 522 than depicted in FIG. 5.

FIG. 5 also depicts a set of bit lines 514. FIG. 5 shows twenty-four bit lines because only a portion of an erase block is depicted. It is contemplated that more than twenty-four bit lines are connected to vertical columns of the erase block. Each of the circles representing vertical columns has an "x" to indicate its connection to one bit line 516.

The portion of erase block depicted in FIG. 5 includes a set of openings (trench 504, trench 506, trench 508, trench 510, and trench 512). A trench separates layers of the three-dimensional array so that smaller divisions can be used in particular storage operations. For example, in FIG. 5, the trenches, together with separate source line connections, break up a monolithic memory array into portions 518, 520, 526, 528 of four illustrated erase blocks. These trenches facilitate performing an erase operation on one erase block without adversely impacting other erase blocks. Trenches may also be used for other routing signals and in such embodiments be referred to as interconnects or local interconnects. For example, in one embodiment, connections to a source gate select line may connect to the source line by way of a line within one or more trenches.

Although FIG. 5 shows each region having four rows of vertical columns, four portions and sixteen rows of vertical columns, those exact numbers are an example implementation. Other embodiments may include more or less regions, more or less rows of vertical columns per region and more or less rows of vertical columns per block.

FIG. 5 also shows the vertical columns being staggered. In other embodiments, different patterns of staggering can be used. In some embodiments, the vertical columns are not staggered.

FIG. 6 depicts a portion of an embodiment of the non-volatile memory media 120 showing a cross-sectional view of a portion of a memory array 600. As indicated in FIG. 5, this cross-sectional view cuts through vertical column 522 and vertical column 524 and 520 (see FIG. 5). The structure of FIG. 6 includes four drain side select layers SGD0, SGD1, SGD2, and SGD3; four source side select layers SGS0, SGS1, SGS2, and SGS3; four dummy word line layers DWLL1 a, DWLL1 b, DWLL2 a, and DWLL2 b; and forty-eight data word line layers WLL0-WLL47 for connecting to data memory cells. Other embodiments can implement more or less than four drain side select layers, more or less than four source side select layers, more or less than four dummy word line layers, and more or less than forty-eight word line layers. Vertical column 522 and vertical column 524 are depicted protruding through the drain side select layers, source side select layers, dummy word line layers and word line layers. In one embodiment, each vertical column comprises a NAND string. Below the vertical columns and the layers listed below is a substrate 602, an insulating film 604 on the substrate 602, and source line 316 (SL). The NAND string of vertical column 522 has a source end at a bottom of the stack and a drain end at a top of the stack. As in agreement with FIG. 5, FIG. 6 shows vertical column 522 connected to bit line 516 via connector 606. Trench 506 and trench 508 are also depicted. Portions of an erase block 518 and 526 extend to either side of the portion shown.

For ease of reference, drain side select layers SGD0, SGD1, SGD2, and SGD3; source side select layers SGS0, SGS1, SGS2, and SGS3; dummy word line layers DWLL1 a, DWLL1 b, DWLL2 a, and DWLL2 b; and word line layers WLL0-WLL47 collectively are referred to as the conductive layers. In one embodiment, the conductive layers are made from a combination of TiN and Tungsten. In other embodiments, other materials can be used to form the conductive layers, such as doped polysilicon, metal such as Tungsten, or metal silicide. In some embodiments, different conductive layers can be formed from different materials. Between conductive layers are dielectric layers DL0-DL59. For example, dielectric layers DL49 is above word line layer WLL43 and below word line layer WLL44. In one embodiment, the dielectric layers are made from SiO2. In other embodiments, other dielectric materials may be used to form the dielectric layers.

The non-volatile memory cells are formed along vertical columns (also referred to as channels) which extend through alternating conductive and dielectric layers in the stack. In one embodiment, the memory cells are arranged in NAND strings. The word line layers WLL0-WLL47 connect to storage cells (also called storage cells, memory cells, or data memory cells). Dummy word line layers DWLL1 a, DWLL1 b, DWLL2 a, and DWLL2 b connect to dummy storage cells. A dummy storage cell does not store user data, while a data storage cell is eligible to store user data. Drain side select layers SGD0, SGD1, SGD2, and SGD3 are used to electrically connect and disconnect NAND strings from bit lines. Source side select layers SGS0, SGS1, SGS2, and SGS3 are used to electrically connect and disconnect NAND strings from the source line 316 SL. The memory array 700 shown is illustrated in more detail in FIG. 7.

FIG. 7 illustrates a cross-sectional view of a memory array 700. In one embodiment, the vertical column 522 is round and includes four layers; however, in other embodiments more or less than four layers can be included and other shapes can be used (e.g., a "U" shape instead of an "I" shape or the like). In one embodiment, a vertical column 522 includes an inner core layer 702 that is made of a dielectric, such as SiO2. Other materials can also be used. Surrounding the inner core layer 702 is a polysilicon channel 704. Materials other than polysilicon can also be used. Note that it is the channel 704 that connects to the bit line. Surrounding the channel 704 is a tunneling dielectric 706. In one embodiment, tunneling dielectric 706 has an ONO structure. Surrounding the tunneling dielectric 706 is a shared charge trapping layer 708, such as (for example) Silicon Nitride.

Other materials and structures can also be used. The technology described herein is not limited to any particular material or structure.

FIG. 7 depicts dielectric layers DL49, DL50, DL51, DL52, and DL53, as well as word line layers WLL43, WLL44, WLL45, WLL46, and WLL47. Each of the word line layers includes a word line region 710 surrounded by an aluminum oxide layer 712, which is surrounded by a blocking oxide layer 714, which may be of SiO2. The physical interaction of the word line layers with the vertical column forms the storage cell (also referred to as a memory cell). Thus, a storage cell, in one embodiment, comprises channel 704, tunneling dielectric 706, charge trapping layer 708 (e.g., shared with other storage cells), blocking oxide layer 714, aluminum oxide layer 712 and word line region 710. In some embodiments, the blocking oxide layer 714 and aluminum oxide layer 712, may be replaced by a single layer of material with insulating properties or by more than 2 layers of different material with insulating properties. Furthermore, the materials used are not limited to silicon dioxide (SiO2) or aluminum oxide.

For example, word line layer WLL47 and a portion of vertical column 522 comprise a storage cell MC1. Word line layer WLL46 and a portion of vertical column 522 comprise a storage cell MC2. Word line layer WLL45 and a portion of vertical column 522 comprise a storage cell MC3. Word line layer WLL44 and a portion of vertical column 522 comprise a storage cell MC4. Word line layer WLL43 and a portion of vertical column 522 comprise a storage cell MC5. In other architectures, a storage cell may have a different structure; however, the storage cell would still be the data storage unit.

When a storage cell is programmed, electrons are stored in a portion of the charge trapping layer 708 which is associated with the storage cell. These electrons are drawn into the charge trapping layer 708 from the channel 704 through the tunneling dielectric 706, in response to an appropriate voltage on word line region 710. The threshold voltage (Vth) of a storage cell is increased in proportion to the amount of stored charge. In one embodiment, the programming is achieved through Fowler-Nordheim tunneling of the electrons into the charge trapping layer. During an erase operation, the electrons return to the channel or holes are injected into the charge trapping layer to recombine with electrons. In one embodiment, erasing is achieved using hole injection into the charge trapping layer via a physical mechanism such as gate induced drain leakage (GIDL).

Storage cells in the same location or position in different memory structures (e.g., different NAND strings) on different bit lines, in certain embodiments, may be on the same word line. Each word line may store one page of data, such as when 1-bit of data is stored per single-level cell (SLC); two pages of data, such as when 2-bits of data are stored per multi-level cell (MLC); three pages of data, such as when 3-bits of data are stored per triple-level cell (TLC); four pages of data, such as when 4-bits of data are stored per quad-level cell (QLC); or another number of pages of data.

In the depicted embodiment, a vertical, 3D NAND flash memory structure comprises an "I" shaped memory structure. In other embodiments, a vertical, 3D NAND flash memory structure may comprise a "U" shaped structure, or may have another vertical and/or stacked architecture. In certain embodiments, four sets of strings (e.g., four sets of 48 word lines, or another predefined number of word lines) may form an erase block, while in other embodiments, fewer or more than four sets of strings may form an erase block. As may be appreciated, any suitable number of storage cells may be part of a single NAND string. In one embodiment, a NAND string includes 48 storage cells.

Figure 8:
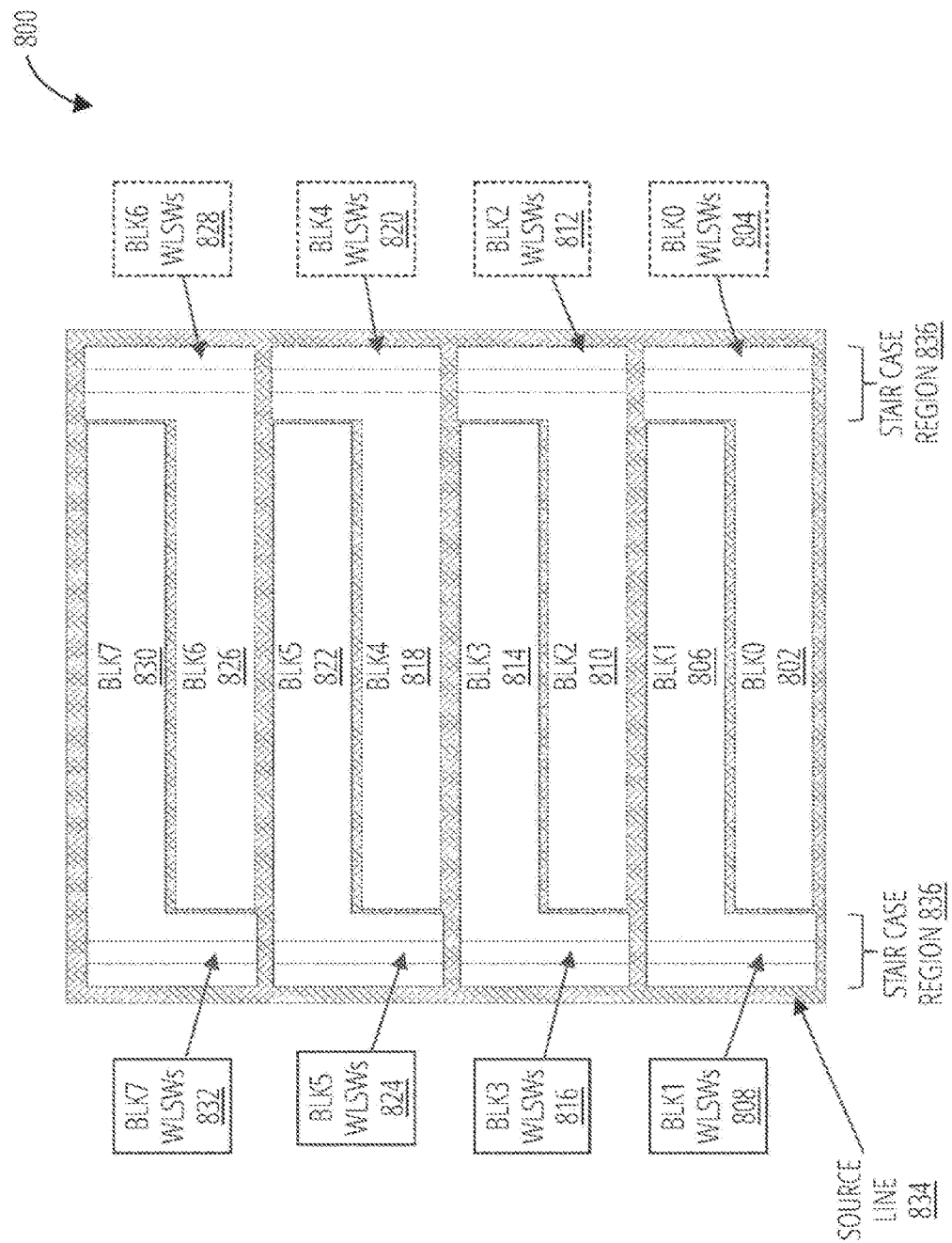
FIG. 8 illustrates a word lines driven from one side in accordance with aspects of the disclosure.

FIG. 8 shows word lines driven from one side 800. Eight erase blocks of memory are shown: BLK0 802, BLK1 806, BLK2 810, BLK3 814, BLK4 818, BLK5 822, BLK6 826, and BLK7 830. Note that these numbers are used solely for labeling purposes, and are not intended to represent an exact physical location within a memory array. These erase blocks may be configured as described in FIG. 5-FIG. 7.

As used herein, an "erase block" or "memory block" comprises a set of storage cells organized within a memory array such that an erase storage operation impacts each of the storage cells within the erase block. Ideally, each storage cell of the erase block transitions to an erased state due to the erase storage operation. In practice, certain storage cells may not transition to an erased state and therefore are in an error state due to not erasing properly.

A single conductive layer may underlie all of the erase blocks and provide a common source line 834. This corresponds to the source line 402 shown in FIG. 4. To the left and the right side of each erase block, as this drawing is oriented, a stair case region 836 may exist. In this region 836, connections may be made between word line layers and high voltage word line switches which are connected of one or more voltage sources that are referred to herein as drivers. The gates used to drive memory command signals and to switch those signals to specific locations in memory may, at least in part, reside in, and connect through, the stair case region 836.

Word lines are conventionally driven from only one side because of the area required for the row decoder logic illustrated in FIG. 2. (e.g., row decoder A 218 and row decoder B 220) In a conventional architecture for the memory array, the silicon area needed for the row decoders to drive each word line from both sides would need to be twice the conventional area used for row decoders that drive each word line from only one side.

In a conventional memory array, the row decoders on either side of the memory array are configured to drive half of the word lines and/or erase blocks. In order to accommodate the logic and connections needed for each block, a conventional die layout alternates which sets of high voltage word line switches of the stair case region 836 adjacent to an erase block will connect to and drive the word lines within the erase block.

This alternating connection pattern is illustrated in FIG. 8 using solid and dotted lines to show which stair case region comprising the word line switches (WLSWs) that control each erase block. Starting at the bottom, BLK0 802 is controlled and/or driven by the BLK0 WLSWs 804 located to the right, while BLK1 806 is controlled and/or driven by the BLK1 WLSWs 808 to the left. BLK2 810 is controlled and/or driven by BLK2 WLSWs 812 to the right, and BLK3 814 is controlled and/or driven by BLK3 WLSWs 816 to the left. BLK4 818 is controlled and/or driven by BLK4 WLSWs 820, BLK5 822 by BLK5 WLSWs 824, BLK6 826 by BLK6 WL SWs 828, and BLK7 830 by BLK7 WLSWs 832.

Note that in this configuration, signals (e.g. Voltage and/or Current) that the WLSWs pass to the coupled word lines propagate down the entire length of the word line layer to reach all storage cells constructed around vertical columns along the word line including storage cells at the opposite end from the WLSWs. This worst-case latency may result in reduced performance that does not meet current demands for non-volatile memory media 120.

Figure 9:
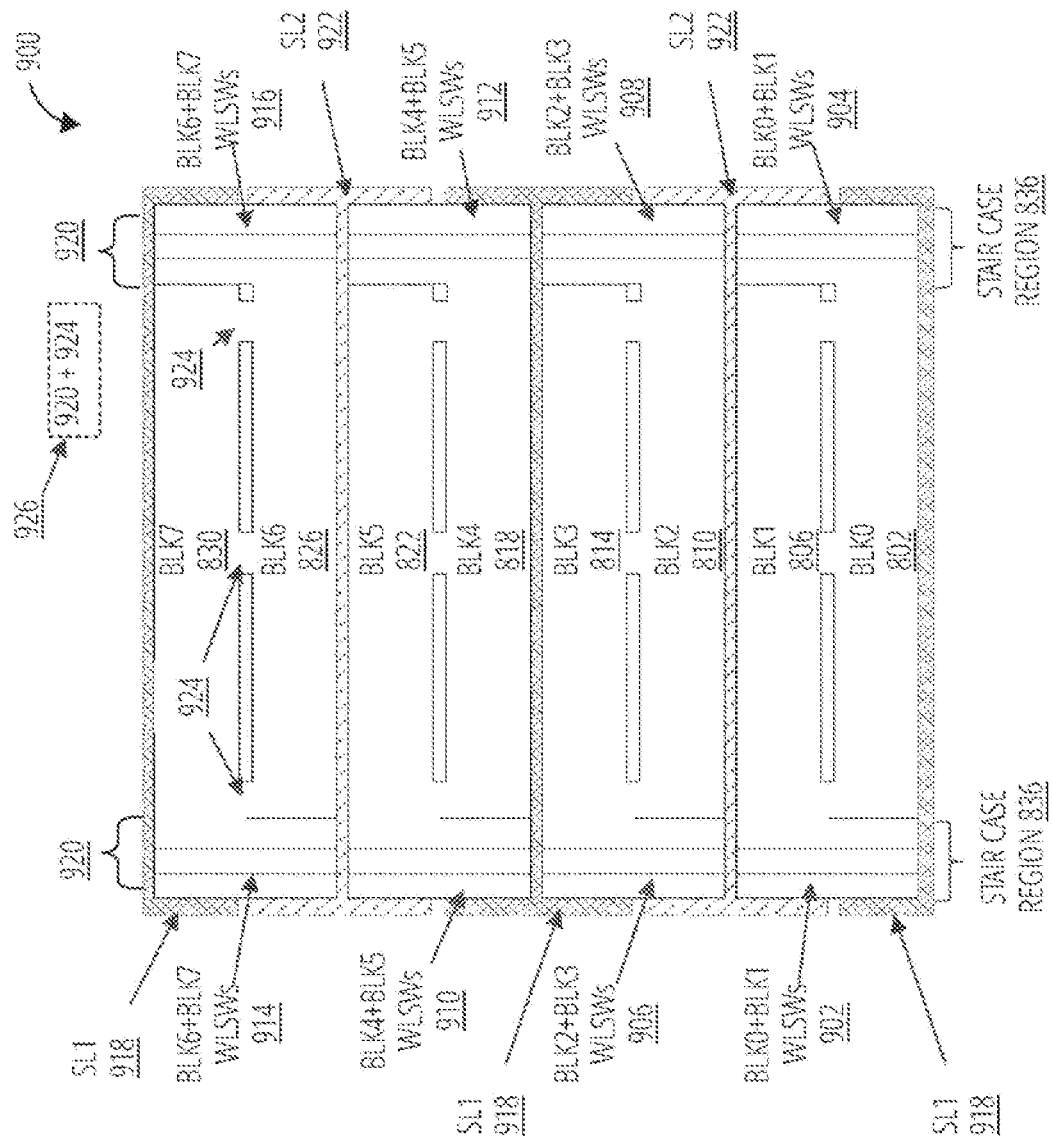
FIG. 9 illustrates a memory array according to aspects of the disclosure.

FIG. 9 illustrates a top down view of a memory array 900 in accordance with one embodiment. Certain details are not illustrated (e.g., bit lines and vertical columns) for clarity in illustrating other elements.

The memory array 900 includes a three-dimensional array of storage cells organized into rows and columns. The rows comprise a plurality of word lines and the columns connect to bit lines. The word lines are organized into erase blocks BLK0 802, BLK1 806, BLK2 810, BLK3 814, BLK4 818, BLK5 822, BLK6 826, and BLK7 830.

Storage cells within the memory array connect to the die controller 206 by way of row decoder A 218, row decoder B 220, column decoder A 226, and column decoder B 228. The die controller 206 supplies voltages and/or currents to circuits and logic of the decoders to implement storage operations such as reading storage cells, writing storage cells, and/or erasing storage cells.

In particular, the row decoders and/or column decoders include logic, such as switches, for selectively connecting the storage cells to a voltage driver such as, voltage driver 234 (See FIG. 2). In one embodiment, the memory array includes a connection circuit. A connection circuit is any electrical circuit configured to electrically couple one or more circuit drivers (voltage and/or current) to two ends of a word line. In certain embodiments, a connection circuit includes one or more gates or switches to enable either selective coupling, or substantially simultaneous coupling, of certain components to the driver(s). The connection circuit provides an electrical conductive path that includes one or more word lines in a first set of word lines, one or more word lines in a second set of word lines and a common driver, such as voltage driver 234.

In certain embodiments, the connection circuit includes a plurality of switches (e.g., 902, 904, 906, 908, 910, 912, 914, 916) positioned in the stair case region 836. The switches selectively connect each word line of an erase block to the voltage driver 234. In one embodiment, the switch is a transistor with one terminal in electrical communication to a word line and the other terminal in electrical communication with the voltage driver 234 and the gate in electrical communication with the die controller 206 (e.g., state machine 208).

In the embodiment illustrated in FIG. 9, the connection circuit 926 electrically connects a first word line in one erase block, (e.g., BLK0 802) and a second word line in an adjacent erase block, (e.g., BLK1 806) to the same voltage driver 234. In certain embodiments, the connection circuit 926 includes circuits, logic, or the like, to enable the state machine 208 to activate a switch positioned on one side of the erase block (e.g., BLK0 802) and to substantially simultaneously activate a switch positioned on an opposite end of the erase block (e.g., BLK1 806). In this manner, the state machine 208, voltage driver 234, and connection circuit 926 work together to supply a voltage signal (e.g., bias) to both the second word line and the first word line from both ends at substantially the same time.

As used herein, an adjacent erase block comprises an erase block positioned next to or in close proximity to an existing erase block, with no other erase blocks between them. In the embodiment illustrated in FIG. 9, BLK0 802 and BLK1 806 are representative examples of adjacent erase blocks. Conversely, BLK0 802 and BLK2 810 are not adjacent erase blocks because BLK1 806 is positioned between them.

As mentioned above, analog circuits, such as those of the word lines, experience resistive-capacitive (RC) loading when a voltage is applied. As explained in relation to FIG. 3, voltage applied to the word line is applied to the gate of the storage cells along the word line to bias a storage cell for a storage operation.

A memory array 900 configured with the state machine 208, voltage driver 234 (see FIG. 2), and connection circuit 926 adjusts a voltage signal (e.g., bias) on the second word line and the first word line from both ends at substantially the same time which mitigates delay caused by RC loading. FIG. 8 illustrates an embodiment from a top view, consequently, details of connections between one word line in a selected erase block, such as BLK0 802 and another word line in an unselected erase block, such as word line layers and/or connection circuits of the memory array that are below this top level view are not shown here for clarity. However, these details are included in subsequent figures of other embodiments. It should be noted that in the embodiments described herein, each word line within a selected erase block of a three-dimensional array is coupled to a corresponding word line in an adjacent erase block of the three-dimensional array.

In order to reduce the latency incurred in propagating a signal across the entire length of a word line, the apparatus disclosed herein uses the WLSWs (of the connection circuit) on both sides of a pair of adjacent erase blocks to drive signals onto word line layers from both ends. Thus, the worst case latency is incurred at the middle of the word line layer, and is much less than the latency incurred through propagating a signal from one end to the other.

As illustrated, in the depicted embodiment, WLSWs located in both stair case regions are used to drive the even and odd adjacent erase blocks. BLK0+BLK1 WLSWs 902 and BLK0+BLK1 WLSWs 904 both drive BLK0 802 as well as BLK1 806. BLK2+BLK3 WLSWs 906 and BLK2+BLK3 WLSWs 908 drive BLK2 810 and BLK3 814. BLK4+BLK5 WLSWs 910 and BLK4+BLK5 WLSWs 912 drive BLK4 818 and BLK5 822. BLK6+BLK7 WLSWs 914 and BLK6+BLK7 WLSWs 916 drive BLK6 826 and BLK7 830.

Additionally, using switches on both sides to drive both erase blocks, rather than alternating driving gates for a single erase block from one side to the other, reduces the RC delay and propagation latency, without increasing the row decoder (e.g., row decoder A 218, row decoder B 220) layout area.

Generally, the word lines of the memory array 900 experience voltages ranging from about 0 volts to about 20 volts. In embodiments in which the connection circuit 926 includes switches that connect both sides of one or more word lines to a common driver (e.g., voltage driver 234) and the switches comprise transistors, the transistors are large in comparison to other CMOS components of the memory array 900. Consequently, word line switches for one erase block may occupy space vertically aligned with word lines of an adjacent erase block as well as space vertically aligned with word lines of a particular erase block. (For example, in FIG. 9, switches of BLK0+BLK1 WLSWs 904 connect to both BLK0 802 and BLK1 806 using the same area that prior designs used to connect to a single erase block.)

In one embodiment, the connection circuit 926 includes both one or more external conductive links 920 and one or more internal conductive links 924. External conductive links 920 are electrical components external to (outside the perimeter of) a memory array that are configured to conduct, or pass, a voltage or current between two word lines of the memory array and voltage driver 234. Examples of external conductive links 920 and/or components that may comprise one or more external conductive links 920, include, but are not limited to, wires, leads, traces, metal lines, resistors, conductors, capacitors, inductors, switches, and the like.

Internal conductive links 924 are electrical components internal to (within the perimeter of) a memory array that are configured to conduct, or pass, a voltage or current between two word lines of the memory array and voltage driver 234. Examples of internal conductive links 924 and/or components that may comprise one or more internal conductive links 924, include, but are not limited to, wires, leads, traces, metal lines, resistors, conductors, capacitors, inductors, switches, and the like. In one embodiment, the connection circuit includes just external conductive links 920 and no internal conductive links 924.

Note that in FIG. 8 the word line layers within the die are split by way of trench to separate adjacent erase blocks. In the disclosed apparatus, one word line in either erase block is driven by a common driver that also drives a word line at the same layer of the memory array in the other erase block, so this separation is not necessary. Consequently, adjacent erase blocks may be operated as a single erase block that is double in size versus embodiments that include trench. Embodiments, having a larger erase block size may be used for products having a more limited capacity but optimized to store large sets of contiguous data for fast read access.

As used herein, a "selected" component refers to a component that a command, instruction, or controller, such as a die controller 206 or storage controller 216 is targeting/addressing/selecting for a particular operation. Examples of such references include selected storage cell, selected page of storage cells, selected word line, selected erase block, selected plane, selected memory die, and the like. As used herein, an "unselected" component refers to a component that a command, instruction, or controller, such as a die controller 206 or storage controller 216 is not targeting/addressing/selecting for a particular operation. Examples of such references include unselected storage cell, unselected page of storage cells, unselected word line, unselected erase block, unselected plane, unselected memory die, and the like. The operation may comprise an internal testing or maintenance operation (e.g., garbage collection, test mode operation), a user command/request, or a particular storage operation such as a read operation, write operation, or erase operation. Due to various semiconductor architectures and configurations, like components may be connected, coupled, or otherwise associated with each other, in such a way that an operation on a selected component adversely impacts the unselected component. For example, in a read operation of a storage cell of a NAND string, unselected storage cells along the NAND string are turned on, activated, such that a programmed state of a selected storage cell can be sensed. During the read operation, activating the unselected storage cells along the NAND string may unintentionally change a threshold voltage of certain unselected storage cells along the NAND string. This unintended change is known as a 'disturb' or 'interference'. In order to perform a desired operation voltage signals or a bias at one level may be sent to selected components, while different magnitude voltage signals are sent to unselected components.

Figure 10:
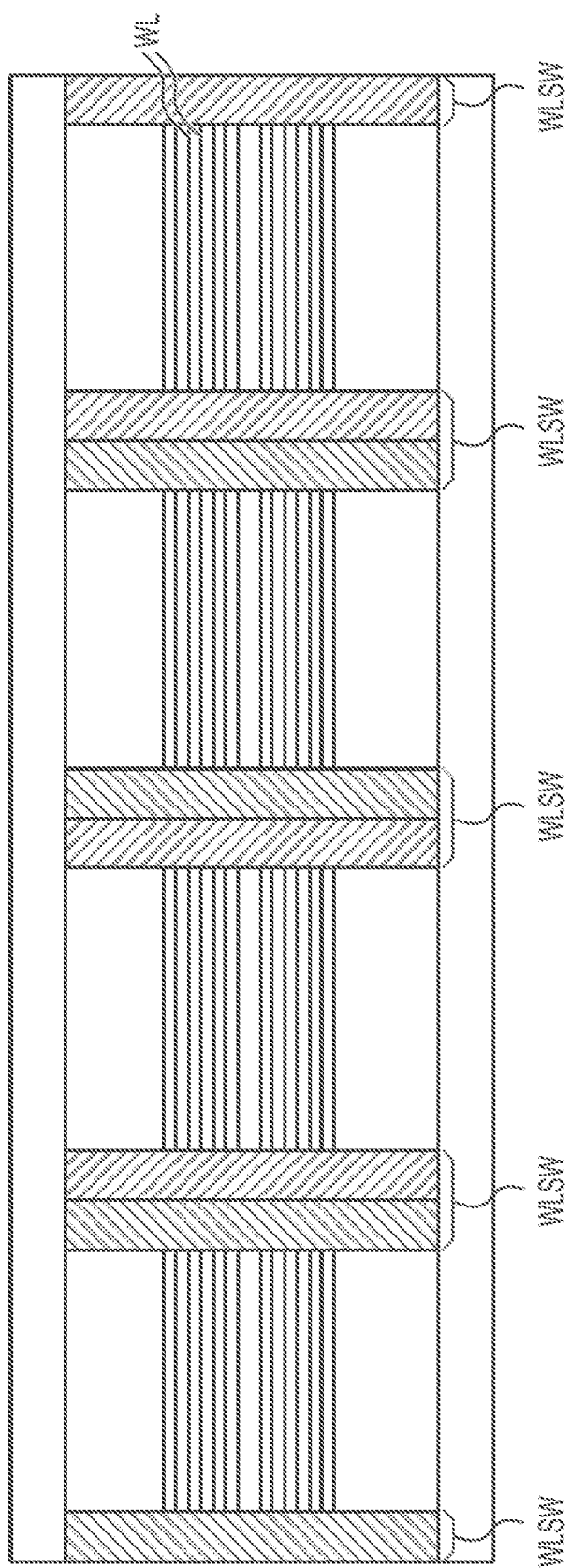
FIG. 10 shows a side cross-sectional view of an example memory die and illustrates a portion of the die in which word line switches reside according to aspects of the disclosure.

As mentioned above, the quantity of word line switches per block increases as memory devices utilize an increasing quantity of word lines. As a result, a width of switches increases and thus the area of the memory die needed for the word line switches also increases. FIG. 10 shows a side cross-sectional view of an example memory die and illustrates a portion of the die in which word line switches reside. The width of the area where the word line switches are disposed (indicated as WLSW) depends on the quantity of the word line switches, the width of each word line switch, and a shallow trench isolation (STI) space between each word line switch for providing electrical isolation. With structures such as CMOS bonded Array (CbA), the width of the area for the word line switches is even more of an issue, because the array of memory cells can shrink dramatically, whereby the CMOS (complementary metal-oxide-semiconductor) footprint is larger than the array footprint, resulting in reduced chip area/cost efficiency.

Figure 11:
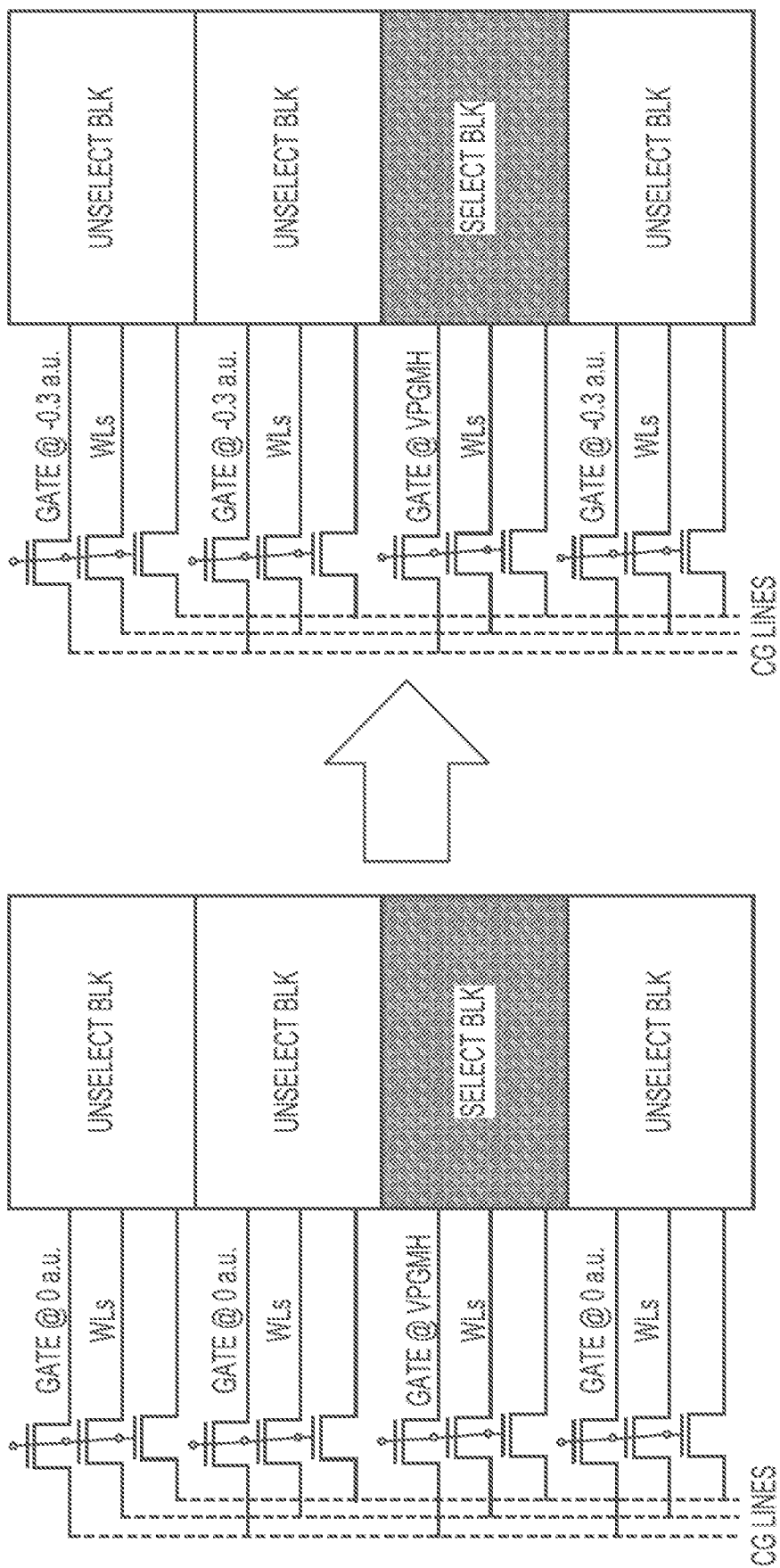
FIG. 11 shows word line switches connected to word lines of a selected block and multiple unselected blocks along with voltages applied to gates of the word line switches for two different schemes according to aspects of the disclosure.

The purpose of the word line switches is avoid a transfer of the bias from the control gate (CG) lines to unselected blocks. FIG. 11 shows word line switches connected to word lines of a selected block and multiple unselected blocks along with voltages applied to gates of the word line switches for two different schemes. Specifically referring to the left hand side, approximately zero volts may be applied to the gates of the word line switches of the unselected blocks, while a voltage VPGMH is applied to the gates of the word line switches of the selected block to allow a program voltage to be passed to the word lines of the selected block.

Figure 12:
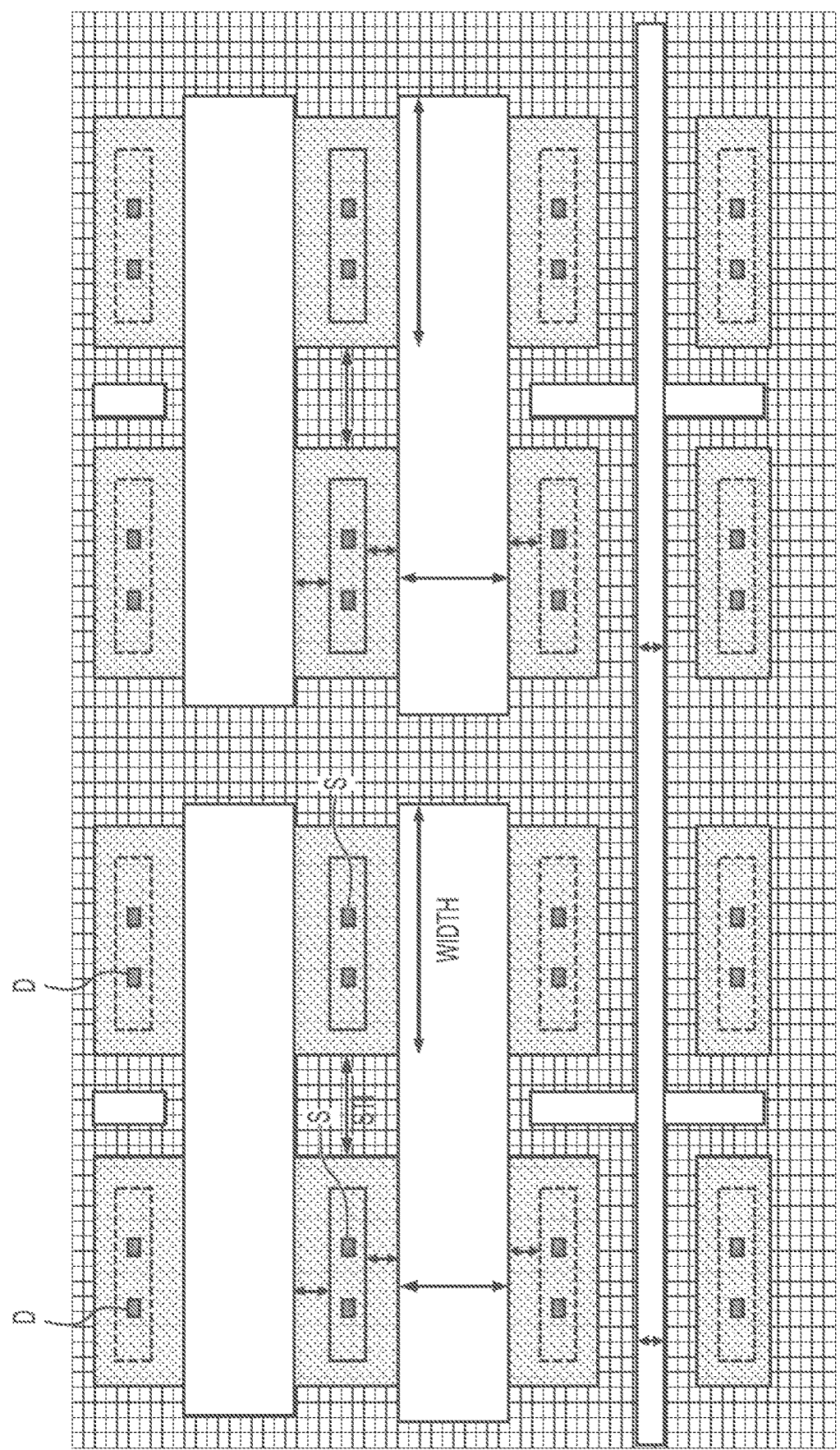
FIG. 12 shows a top cross-sectional view of a portion of an example memory die illustrating dimensions of word line switches including at least one width according to aspects of the disclosure.
Figure 13:
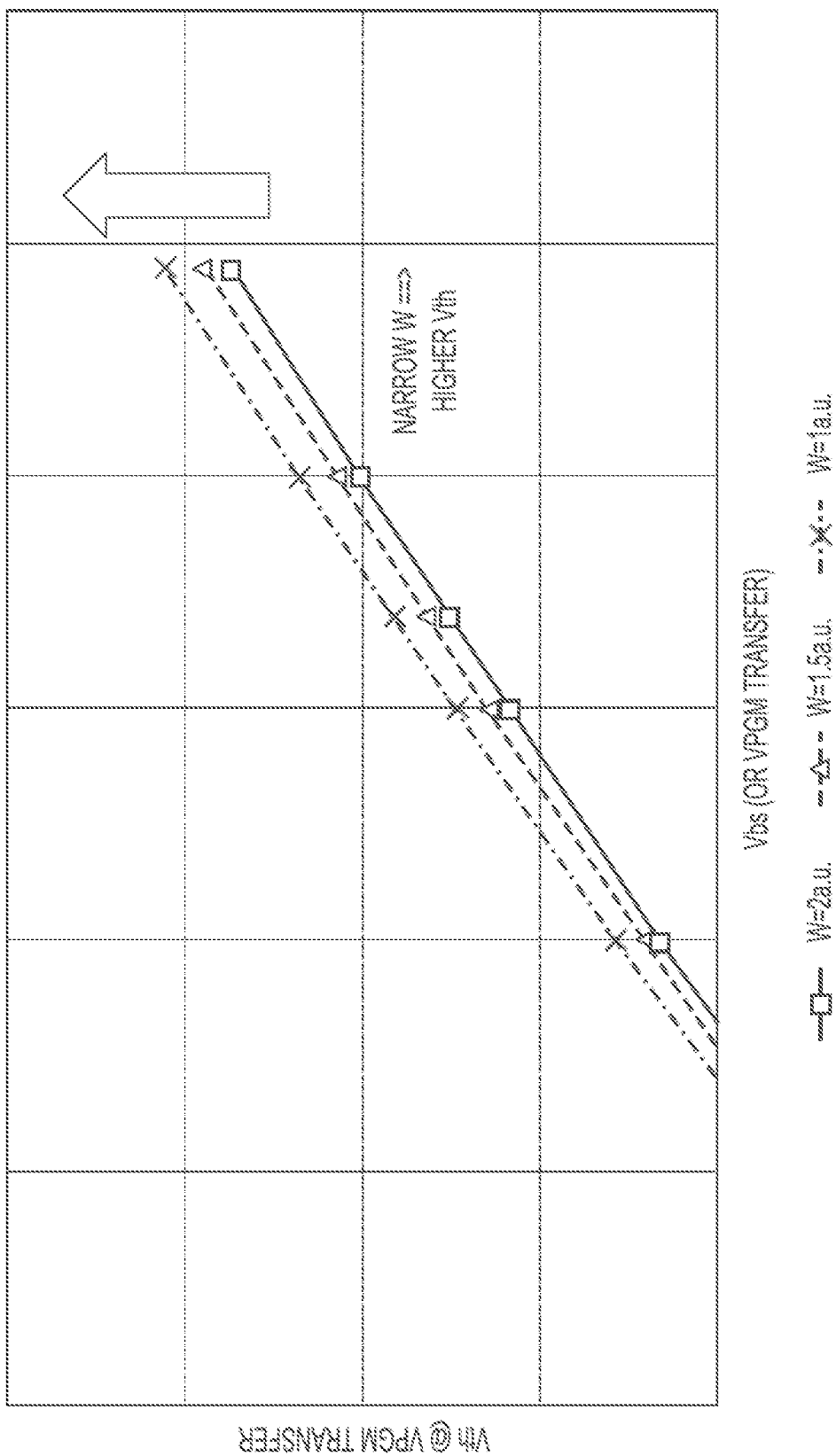
FIG. 13 is a plot of a switch threshold voltage of the word line switch versus a back bias of the word line switch for different widths of the word line switch according to aspects of the disclosure.

FIG. 12 shows a top cross-sectional view of a portion of an example memory die illustrating dimensions of word line switches including at least one width. FIG. 13 is a plot of a switch threshold voltage Vth_WLSW of the word line switch versus a back bias of the word line switch Vbs for different widths (W) of the word line switch. High voltage CMOS breakdown limits a maximum voltage and the chip Vmax which in turn determines maximum voltage which can applied to the gate of word line switch WLSW Vwlswmax. The maximum voltage of the word line switch Vwlswmax together with a maximum program voltage VPGMmax determines the width of the word line switches. So, the maximum voltage of the word line switch Vwlswmax equals the maximum program voltage VPGMmax plus an overdrive voltage Vov plus the switch threshold voltage Vth_WLSW of the word line switch when the switch is transferring maximum program voltage VPGMmax (Vwlswmax=VPGMmax+Vth_WLSW(@ Vb=VPGMmax)+Vov). Since the switch threshold voltage Vth_WLSW when the back bias of the word line switch Vbs equals the maximum program voltage VPGMmax increases with reducing width, it places a constraint of minimum width of the word line switch. Thus, to reduce the width of word line switch, it is advantageous to lower the switch threshold voltage Vth_WLSW of the word line switch when the back bias of the word line switch Vb is relatively high (e.g., when the back bias of the word line switch Vb equals the maximum program voltage VPGMmax)

Consequently, described herein is a memory apparatus (e.g., memory device 200 of FIG. 2) including word line switches (e.g., BLK0 WLSWs 804, BLK1 WLSWs 808, BLK2 WLSWs 812 BLK3 WLSWs 816 BLK4 WLSWs 820 BLK5 WLSWs 824 BLK6 WLSWs 828 BLK7 WLSWs 832 of FIG. 8 or BLK0+BLK1 WLSWs 902, BLK0+BLK1 WLSWs 904, BLK2+BLK3 WLSWs 906, BLK2+BLK3 WLSWs 908, BLK4+BLK5 WLSWs 910, BLK4+BLK5 WLSWs 912, BLK6+BLK7 WLSWs 914, BLK6+BLK7 WLSWs 916 of FIG. 9) coupled to a plurality of word lines (e.g., word line layers WLL43-WLL47 of FIG. 7) each connected to memory cells (e.g., storage cells MC1-MC5 of FIG. 7). The word line switches are each configured to retain a switch threshold voltage Vth_WLSW and selectively connect one or more of the plurality of word lines to a common driver (e.g., voltage driver 234 OF FIG. 2) for supplying voltages to the one or more of the plurality of word lines during a memory operation. The memory apparatus also includes a control circuit or means (e.g., one or any combination of controller 126 of FIG. 1, die controller 206, decoders 218, 220, 226, sense blocks SBb, SB2, ..., SBp, read/write circuits 222, 224, controller 216 of FIG. 2 and so forth) coupled to the word line switches. The control means is configured to apply predetermined select block switch voltages (e.g., voltage VPGMH applied to the gates of the word line switches of the selected block to allow a program voltage to be passed to the word lines of the selected block as in FIG. 11) to a first set of the word line switches connected to the plurality of word lines of a selected one of a plurality of blocks of the memory cells (e.g., a block currently being programmed or erased) during the memory operation. The predetermined select block switch voltages are based on the memory operation being performed. The control means is also configured to apply a predetermined unselect block switch voltage to a second set of the word line switches connected to the plurality of word lines of an unselected one of the plurality of blocks of the memory cells (e.g., a block not currently being programmed or erased) during the memory operation. The predetermined unselect block switch voltage is selected to lower the switch threshold voltage Vth_WLSW of the word line switches of the second set. According to an aspect, the predetermined unselect block switch voltage is a negative voltage (e.g., −0.3 volts).

Figure 14:
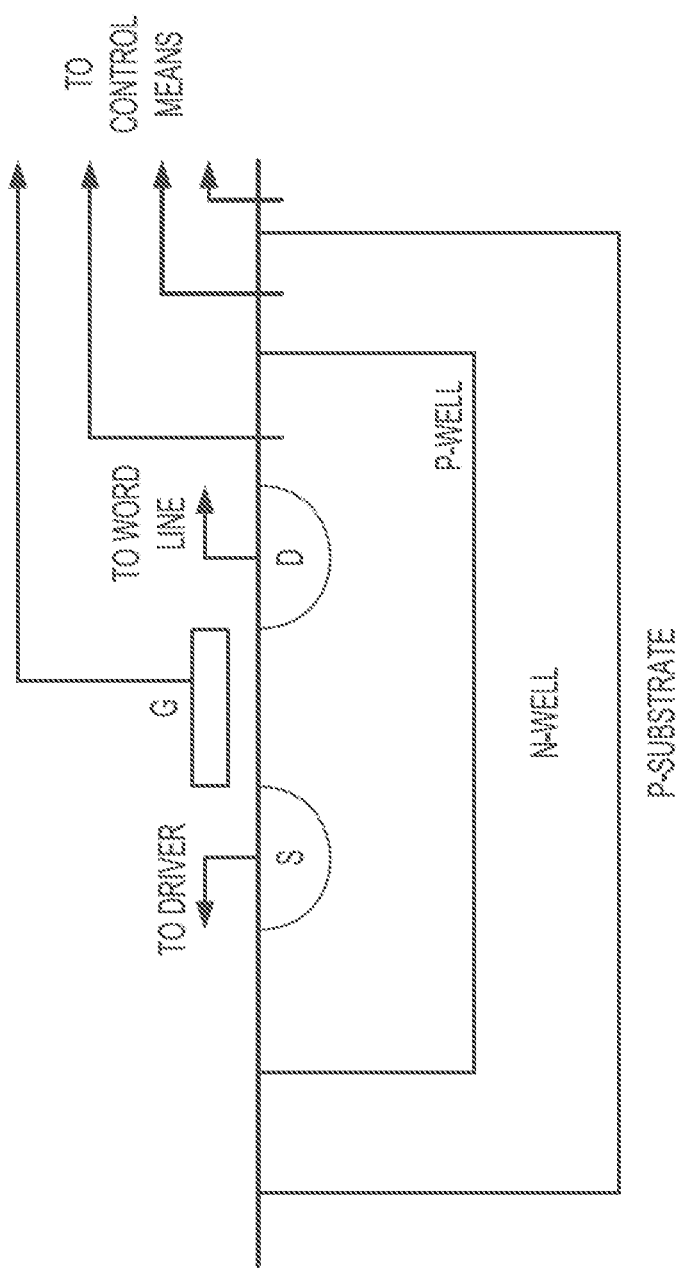
FIG. 14 shows a cross-sectional view of an example word line switch according to aspects of the disclosure.

FIG. 14 shows a cross-sectional view of an example word line switch. Each of the word line switches includes a source (indicated as S) coupled to the common driver and a gate (indicated as G) coupled to the control means and a drain (indicated as D) coupled to the one or more of the plurality of word lines. The source and drain each comprise semiconductor material doped with a first impurity deposited over another semiconductor material doped with a second impurity defining a well (indicated as p-well) coupled to the control means. The control means is configured to apply the predetermined unselect block switch voltage to at least one of the gate and the well of each of the word line switches of the second set.

Referring back to FIG. 11, such a scheme is shown on the right hand side of the figure. Specifically, during program or erase operations, for example, the word line switches (e.g., gate) are biased for the unselected blocks to a negative voltage (for example −0.3 a.u.) So, the negative bias voltage enables to set a lower switch threshold voltage Vth_WLSW of the word line switches Vth. A lower switch threshold voltage Vth_WLSW of the word line switches when the back bias of the word line switch equals the maximum program voltage VPGMmax results in a lower width of the word line switch.

Figure 15:
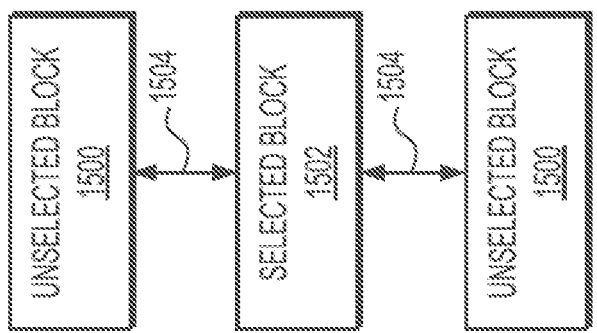
FIG. 15 shows separate wells for a plurality of unselected blocks and another well for a selected block according to aspects of the disclosure.

Still referring to FIG. 11, the control means may apply the predetermined unselect block switch voltage to the gate of each of the word line switches connected to the plurality of word lines of the unselected one of the plurality of blocks of the memory cells during the memory operation. However, referring to FIG. 15, the well may be separate for the plurality of the word line switches for each of the plurality of blocks of the memory cells. In more detail, FIG. 15 shows separate wells 1500 for a plurality of unselected blocks and another well 1502 for a selected block. As shown and according to another aspect, there is a space 1504 defined between each of the wells 1500, 1502. Thus, as an alternative or in addition to only applying the predetermined unselect block switch voltage to the gate of each of the word line switches, the control means may be further configured to apply the predetermined unselect block switch voltage to the well of the word line switches connected to the plurality of word lines of the unselected one of the plurality of blocks of the memory cells during the memory operation.

Referring back to FIG. 14, the well (e.g., p-well) can also be disposed within a second well (e.g., n-well) comprising a further semiconductor material different than the another semiconductor material. The second well can then disposed within a third well (e.g., p-substrate) comprising an additional semiconductor material that is the same as the another semiconductor material. The control means is further configured to apply the predetermined unselect block switch voltage to the well of the word line switches connected to the plurality of word lines of the unselected one of the plurality of blocks of the memory cells while applying a voltage of approximately zero volts to the second well and the third well during the memory operation. Thus, any leakage in the unselected one of the plurality of blocks is cutoff using a back-bias effect.

Figure 16:
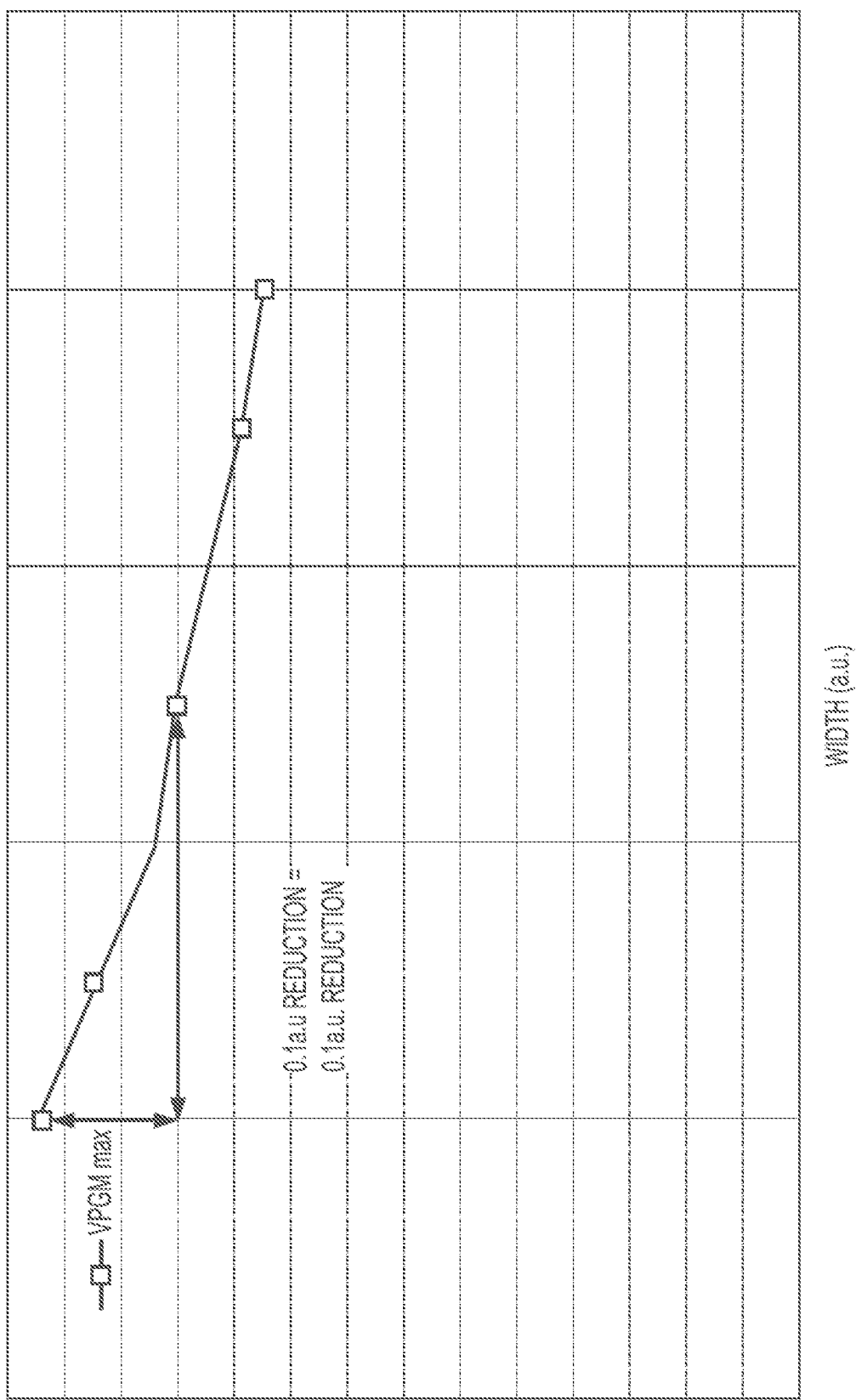
FIG. 16 is a plot of switch threshold voltage of the word line switches versus width of the word line switches for two different program voltages according to aspects of the disclosure.

FIG. 16 is a plot of switch threshold voltage Vth_WLSW of the word line switches versus width of the word line switches for a maximum program voltage VPGMmax. As shown, a reduction in a gate voltage Vg of 0.1 a.u. leads to a reduction in the switch threshold voltage Vth_WLSW of the word line switches by 0.1 a.u. As a result, the width of the word line switches can be reduced by larger amount by applying even more lower gate voltage.

FIG. 17 illustrates steps of a method of operating a memory apparatus. As discussed above, the memory apparatus (e.g., memory device 200 of FIG. 2) includes word line switches (e.g., BLK0 WLSWs 804, BLK1 WLSWs 808, BLK2 WLSWs 812 BLK3 WLSWs 816 BLK4 WLSWs 820 BLK5 WLSWs 824 BLK6 WLSWs 828 BLK7 WLSWs 832 of FIG. 8 or BLK0+BLK1 WLSWs 902, BLK0+BLK1 WLSWs 904, BLK2+BLK3 WLSWs 906, BLK2+BLK3 WLSWs 908, BLK4+BLK5 WLSWs 910, BLK4+BLK5 WLSWs 912, BLK6+BLK7 WLSWs 914, BLK6+BLK7 WLSWs 916 of FIG. 9) coupled to a plurality of word lines (e.g., word line layers WLL43-WLL47 of FIG. 7) each connected to memory cells (e.g., storage cells MC1-MC5 of FIG. 7). The word line switches are each configured to retain a switch threshold voltage Vth_WLSW and selectively connect one or more of the plurality of word lines to a common driver (e.g., voltage driver 234 OF FIG. 2) for supplying voltages to the one or more of the plurality of word lines during a memory operation. The method includes the step of 1700 applying predetermined select block switch voltages to a first set of the word line switches connected to the plurality of word lines of a selected one of a plurality of blocks of the memory cells during the memory operation. The predetermined select block switch voltages are based on the memory operation being performed. The method also includes the step of 1702 applying a predetermined unselect block switch voltage to a second set of the word line switches connected to the plurality of word lines of an unselected one of the plurality of blocks of the memory cells during the memory operation. The predetermined unselect block switch voltage selected to lower the switch threshold voltage Vth_WLSW of the word line switches of the second set. Again, according to an aspect, the predetermined unselect block switch voltage is a negative voltage.

Referring back to FIG. 14, as discussed above, each of the word line switches includes the source (indicated as S) coupled to the common driver and the gate (indicated as G) coupled to the control means and the drain (indicated as D) coupled to the one or more of the plurality of word lines. The source and drain each comprise semiconductor material doped with the first impurity deposited over another semiconductor material doped with a second impurity defining the well (indicated as p-well). Thus, the method can further include the step of applying the predetermined unselect block switch voltage to at least one of the gate and the well of each of the word line switches of the second set.

As discussed above, the predetermined unselect block switch voltage may be applied to the gate of each of the word line switches connected to the plurality of word lines of the unselected one of the plurality of blocks of the memory cells during the memory operation. Nevertheless, according to an aspect and referring back to FIG. 15, the well may be separate for the plurality of the word line switches for each of the plurality of blocks of the memory cells. Specifically, there are separate wells 1500 for the plurality of unselected blocks and another well 1502 for the selected block. As shown and according to another aspect, there is a space 1504 defined between each of the wells 1500, 1502. So, as an alternative or in addition to only applying the predetermined unselect block switch voltage to the gate of each of the word line switches, the method may include the step of applying the predetermined unselect block switch voltage to the well of the word line switches connected to the plurality of word lines of the unselected one of the plurality of blocks of the memory cells during the memory operation.

Again, referring back to FIG. 14, the well (e.g., p-well) can also be disposed within a second well (e.g., n-well) comprising a further semiconductor material different than the another semiconductor material. The second well can then disposed within a third well (e.g., p-substrate) comprising an additional semiconductor material that is the same as the another semiconductor material. Thus, the method can further include the step of applying the predetermined unselect block switch voltage to the well of the word line switches connected to the plurality of word lines of the unselected one of the plurality of blocks of the memory cells while applying a voltage of approximately zero volts to the second well and the third well during the memory operation.

Clearly, changes may be made to what is described and illustrated herein without, however, departing from the scope defined in the accompanying claims. The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A memory apparatus, comprising:
word line switches coupled to a plurality of word lines each connected to memory cells, the word line switches each configured to retain a switch threshold voltage and selectively connect one or more of the plurality of word lines to a common driver for supplying voltages to the one or more of the plurality of word lines during a memory operation; and
a control means coupled to the word line switches and configured to:
apply predetermined select block switch voltages to a first set of the word line switches connected to the plurality of word lines of a selected one of a plurality of blocks of the memory cells during the memory operation, the predetermined select block switch voltages based on the memory operation being performed, and
apply a predetermined unselect block switch voltage to at least one of a gate and a well of each of a second set of the word line switches connected to the plurality of word lines of an unselected one of the plurality of blocks of the memory cells during the memory operation, the predetermined unselect block switch voltage selected to lower the switch threshold voltage of the word line switches of the second set, wherein the predetermined unselect block switch voltage is a negative voltage.

2. The memory apparatus as set forth in claim 1, wherein each of the word line switches includes (i) a source coupled to the common driver and the gate, wherein the gate is coupled to the control means, and (ii) a drain coupled to the one or more of the plurality of word lines, the source and drain each comprising semiconductor material doped with a first impurity deposited over another semiconductor material doped with a second impurity defining the well, wherein the well is coupled to the control means.

3. The memory apparatus as set forth in claim 2, wherein the control means is further configured to apply the predetermined unselect block switch voltage to the gate of each of the word line switches connected to the plurality of word lines of the unselected one of the plurality of blocks of the memory cells during the memory operation.

4. The memory apparatus as set forth in claim 2, wherein the well is separate for the plurality of the word line switches for each of the plurality of blocks of the memory cells.

5. The memory apparatus as set forth in claim 4, wherein the control means is further configured to apply the predetermined unselect block switch voltage to the well of the word line switches connected to the plurality of word lines of the unselected one of the plurality of blocks of the memory cells during the memory operation.

6. The memory apparatus as set forth in claim 4, wherein the well is disposed within a second well comprising a further semiconductor material different than the another semiconductor material and the second well is disposed within a third well comprising an additional semiconductor material that is the same as the another semiconductor material and the control means is further configured to apply the predetermined unselect block switch voltage to the well of the word line switches connected to the plurality of word lines of the unselected one of the plurality of blocks of the memory cells while applying a voltage of approximately zero volts to the second well and the third well during the memory operation.

7. A controller in communication with a memory apparatus including word line switches coupled to a plurality of word lines each connected to memory cells, the word line switches each configured to retain a switch threshold voltage and selectively connect one or more of the plurality of word lines to a common driver for supplying voltages to the one or more of the plurality of word lines during a memory operation, the controller configured to:
instruct the memory apparatus to apply predetermined select block switch voltages to a first set of the word line switches connected to the plurality of word lines of a selected one of a plurality of blocks of the memory cells during the memory operation, the predetermined select block switch voltages based on the memory operation being performed; and
instruct the memory apparatus to apply a predetermined unselect block switch voltage to at least one of a gate and a well of each of a second set of the word line switches connected to the plurality of word lines of an unselected one of the plurality of blocks of the memory cells during the memory operation, the predetermined unselect block switch voltage selected to lower the switch threshold voltage of the word line switches of the second set, wherein the predetermined unselect block switch voltage is a negative voltage.

8. The controller as set forth in claim 7, wherein each of the word line switches includes (i) a source coupled to the common driver and the gate and (ii) a drain coupled to the one or more of the plurality of word lines, the source and drain each comprising semiconductor material doped with a first impurity deposited over another semiconductor material doped with a second impurity defining the well, the controller configured to instruct the memory apparatus to apply the predetermined unselect block switch voltage to at least one of the gate and the well of each of the word line switches of the second set.

9. The controller as set forth in claim 8, wherein the controller is further configured to instruct the memory apparatus to apply the predetermined unselect block switch voltage to the gate of each of the word line switches connected to the plurality of word lines of the unselected one of the plurality of blocks of the memory cells during the memory operation.

10. The controller as set forth in claim 8, wherein the well is separate for the plurality of the word line switches for each of the plurality of blocks of the memory cells.

11. The controller as set forth in claim 10, wherein the controller is further configured to instruct the memory apparatus to apply the predetermined unselect block switch voltage to the well of the word line switches connected to the plurality of word lines of the unselected one of the plurality of blocks of the memory cells during the memory operation.

12. A method of operating a memory apparatus including word line switches coupled to a plurality of word lines each connected to memory cells, the word line switches each configured to retain a switch threshold voltage and selectively connect one or more of the plurality of word lines to a common driver for supplying voltages to the one or more of the plurality of word lines during a memory operation, the method comprising the steps of:

applying predetermined select block switch voltages to a first set of the word line switches connected to the plurality of word lines of a selected one of a plurality of blocks of the memory cells during the memory operation, the predetermined select block switch voltages based on the memory operation being performed; and applying a predetermined unselect block switch voltage to at least one of a gate and a well of each of a second set of the word line switches connected to the plurality of word lines of an unselected one of the plurality of blocks of the memory cells during the memory operation, the predetermined unselect block switch voltage selected to lower the switch threshold voltage of the word line switches of the second set, wherein the predetermined unselect block switch voltage is a negative voltage.

13. The method as set forth in claim 12, wherein each of the word line switches includes (i) a source coupled to the common driver and the gate and (ii) a drain coupled to the one or more of the plurality of word lines, the source and drain each comprising semiconductor material doped with a first impurity deposited over another semiconductor material doped with a second impurity defining the well, the method further includes the step of applying the predetermined unselect block switch voltage to at least one of the gate and the well of each of the word line switches of the second set.

14. The method as set forth in claim 13, further including the step of applying the predetermined unselect block switch voltage to the gate of each of the word line switches connected to the plurality of word lines of the unselected one of the plurality of blocks of the memory cells during the memory operation.

15. The method as set forth in claim 13, wherein the well is separate for the plurality of the word line switches for each of the plurality of blocks of the memory cells.

16. The method as set forth in claim 15, further including the step of applying the predetermined unselect block switch voltage to the well of the word line switches connected to the plurality of word lines of the unselected one of the plurality of blocks of the memory cells during the memory operation.

17. The method as set forth in claim 15, wherein the well is disposed within a second well comprising a further semiconductor material different than the another semiconductor material and the second well is disposed within a third well comprising an additional semiconductor material that is the same as the another semiconductor material and the method further includes the step of applying the predetermined unselect block switch voltage to the well of the word line switches connected to the plurality of word lines of the unselected one of the plurality of blocks of the memory cells while applying a voltage of approximately zero volts to the second well and the third well during the memory operation.

* * * * *